US010091197B2

(12) United States Patent
Rhoads et al.

(10) Patent No.: US 10,091,197 B2
(45) Date of Patent: Oct. 2, 2018

(54) CONFIGURING, CONTROLLING AND MONITORING COMPUTERS USING MOBILE DEVICES

(71) Applicant: Digimarc Corporation, Beaverton, OR (US)

(72) Inventors: Geoffrey B. Rhoads, West Linn, OR (US); David L. Cavender, Beaverton, OR (US); Joshua Bickel, Wilsonville, OR (US)

(73) Assignee: Digimarc Corporation, Beaverton, OR (US)

( * ) Notice: Subject to any disclaimer, the term of this patent is extended or adjusted under 35 U.S.C. 154(b) by 305 days.

(21) Appl. No.: 14/989,594

(22) Filed: Jan. 6, 2016

(65) Prior Publication Data

US 2016/0212103 A1    Jul. 21, 2016

Related U.S. Application Data

(60) Provisional application No. 62/104,291, filed on Jan. 16, 2015, provisional application No. 62/132,836, filed on Mar. 13, 2015, provisional application No. 62/145,998, filed on Apr. 10, 2015, provisional application No. 62/152,729, filed on Apr. 24, 2015, provisional application No. 62/160,967, filed on May 13, 2015.

(51) Int. Cl.
*G06F 21/36* (2013.01)
*H04L 29/06* (2006.01)
*H04W 12/02* (2009.01)
*H04W 12/06* (2009.01)
*G06F 21/60* (2013.01)
*H04W 4/80* (2018.01)

(52) U.S. Cl.
CPC .......... *H04L 63/0869* (2013.01); *G06F 21/36* (2013.01); *G06F 21/604* (2013.01); *H04L 63/0442* (2013.01); *H04W 4/80* (2018.02); *H04W 12/02* (2013.01); *H04W 12/06* (2013.01)

(58) Field of Classification Search
CPC ... G06F 21/604; G06F 31/04847; G06F 21/36
USPC ........................................................ 713/169
See application file for complete search history.

(56) References Cited

U.S. PATENT DOCUMENTS 6,611,607 B1    8/2003   Rodriguez
6,947,571 B1    9/2005   Livermore
7,123,740 B2   10/2006   McKinley
(Continued)

OTHER PUBLICATIONS

Configuration Management, Wikipedia article dated Jan. 14, 2015.
(Continued)

*Primary Examiner* — Hadi S Armouche
*Assistant Examiner* — Khalil Naghdali
(74) *Attorney, Agent, or Firm* — Digimarc Corporation

(57) ABSTRACT

A portable computing device captures imagery from a screen of a second computer, decodes information steganographically-encoded in the screen display, and uses the decoded information to establish a secure session with the second computer. Such technology enables a help-desk staffer to interact with a client's desktop computer, without touching the keyboard of the desktop computer, and without interrupting the client's work. A great many other features and arrangements are also detailed.

20 Claims, 15 Drawing Sheets

(56) References Cited

U.S. PATENT DOCUMENTS

| | | | | |
|---|---|---|---|---|
| 7,603,435 B2* | 10/2009 | Welingkar | ............... | H04W 4/00 |
| | | | | 709/217 |
| 7,606,918 B2* | 10/2009 | Holzman | ................ | H04L 63/08 |
| | | | | 709/206 |
| 9,008,315 B2 | 4/2015 | Lord | | |
| 9,445,298 B2 | 9/2016 | Kim | | |
| 9,524,172 B2* | 12/2016 | Krishnamoorthy | ... | G06F 9/4401 |
| 2002/0080171 A1* | 6/2002 | Laferriere | ............... | G06F 3/038 |
| | | | | 715/751 |
| 2003/0179901 A1 | 9/2003 | Stach | | |
| 2004/0243806 A1 | 12/2004 | Miller | | |
| 2005/0062677 A1* | 3/2005 | Nixon | ................. | G05B 19/042 |
| | | | | 345/2.1 |
| 2008/0300011 A1 | 12/2008 | Rhoads | | |
| 2010/0228632 A1 | 9/2010 | Rodriguez | | |
| 2011/0161076 A1 | 6/2011 | Rodriguez | | |
| 2011/0212717 A1 | 9/2011 | Rhoads | | |
| 2012/0284593 A1 | 11/2012 | Rodriguez | | |
| 2013/0308817 A1 | 11/2013 | Dow | | |
| 2014/0029809 A1 | 1/2014 | Rhoads | | |
| 2014/0106710 A1 | 4/2014 | Rodriguez | | |
| 2014/0244494 A1 | 8/2014 | Rodriguez | | |
| 2014/0279493 A1 | 9/2014 | Kamath | | |
| 2015/0089091 A1 | 3/2015 | Tucker | | |
| 2015/0193579 A1* | 7/2015 | Bruce | ................... | G06F 19/321 |
| | | | | 705/2 |
| 2015/0278980 A1 | 10/2015 | Sinclair | | |
| 2016/0112262 A1* | 4/2016 | Johnson | ............. | G06F 9/45504 |
| | | | | 709/221 |

OTHER PUBLICATIONS

Connect with the World Around You Through Nearby APIs, Google Developers Blog, Jul. 14, 2015.
Event Viewer, Wikipedia article dated Dec. 12, 2014.
Internet Information Services, Wikipedia article dated Dec. 23, 2014.
Nearby Connections API, Google, Aug. 22, 2015, from WebArchive.
PowerShell, Wikipedia article dated Jan. 15, 2015.
Public Key Cryptography, Wikipedia article dated Jan. 8, 2015.
Resource Monitor, Wikipedia article dated Dec. 8, 2014.

* cited by examiner

CONFIGURING, CONTROLLING AND MONITORING COMPUTERS USING MOBILE DEVICES

RELATED APPLICATION DATA

The present application claims priority to provisional applications 62/104,291, filed Jan. 16, 2015, 62/132,836, filed Mar. 13, 2015, 62/145,998, filed Apr. 10, 2015, 62/152,729, filed Apr. 24, 2015, and 62/160,967, filed May 13, 2015, the disclosures of which are incorporated herein by reference.

INTRODUCTION

Technical support of corporate employees' desktop systems, as performed by IT "Helpdesk" professionals, presents several issues.

Some issues are security-related. Corporations naturally want to assure that persons outside their organizations are not granted access to corporate computers. Some employees also may want assurance that persons accessing their computer are authorized to do so. These concerns are addressed, in part, by having an IT professional—recognized by a suitable ID badge or other credential—physically appear at an employee's desk, rather than by having support performed remotely. (The appearance of such a person can also help deal with employee stress from the incident, e.g., by having someone to whom the employee can vent, or someone who can offer words of assurance or advice.)

Some tech support issues are productivity related. For example, support should ideally be provided without idling employees whose computers are being serviced.

Some issues are heath related. Bacteria and viruses are commonly transmitted through hand contact. IT professionals may be leery of touching the keyboards of the computers they support. Similarly, an employee may be reluctant to have an IT professional touch their keyboard.

Certain embodiments of the present technology address one or more of these concerns. For example, an IT professional can visit an employee's desk to securely perform certain tasks on the employee's desktop computer, without interrupting the employee's work, and without touching the employee's keyboard.

In one particular embodiment, the IT professional carries a camera-equipped mobile device that captures imagery of the employee's screen while the employee continues to work. Information discerned from the imagery is used in establishing a secure session, in which the mobile device is authenticated to the desktop, and vice versa. Once the session has been established, a collection of diagnostic information is passed between the desktop and mobile device, which the IT professional can review and act on using the mobile device, again without disturbing the user.

As will become evident, the detailed technology spans a great variety of applications, features, and advantages, which extend far beyond IT support.

DETAILED DESCRIPTION

The present technology builds on technology detailed in applicant's previous patents and patent applications, referenced below. The disclosures of the cited documents are expressly incorporated by reference, as if bodily included herein.

For expository convenience, the following description starts with a brief treatment of a first exemplary system. Additional disclosures then follow, elaborating on the themes introduced in the brief treatment, and detailing many further arrangements.

First Exemplary Arrangement

Figure 1:
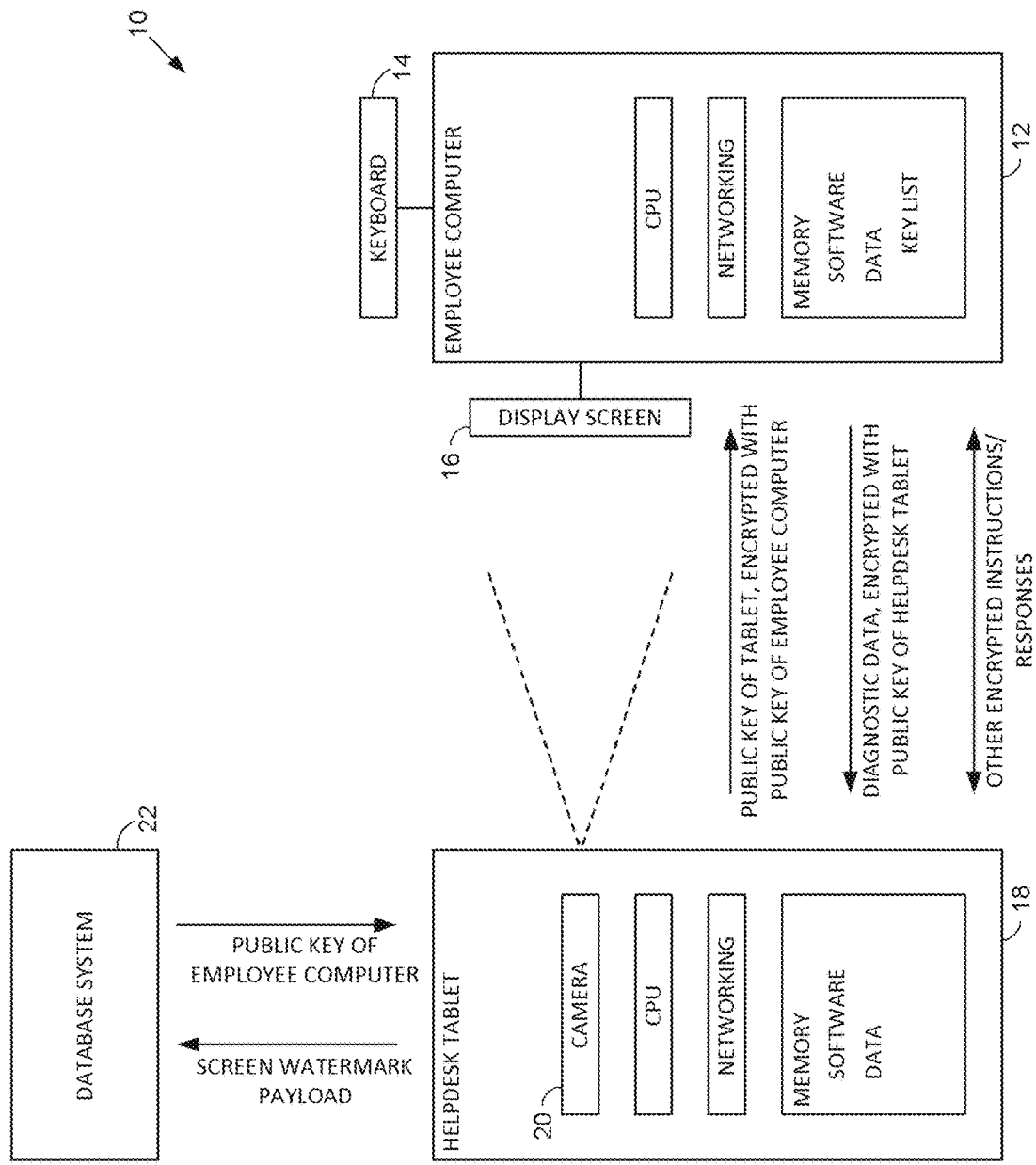
FIG. 1 shows an embodiment employing certain aspects of the present technology.

Referring to FIG. 1, a first exemplary arrangement 10 includes two computer systems and a remote system.

The first computer system 12 is shown as a conventional desktop computer, including a keyboard 14 and display screen 16. Also included are customary computer elements, such as a CPU, memory, and networking interface. In this exemplary arrangement, computer 12 is used by an employee.

The memory of computer 12 includes various types of information, such as operating system software, applications software, data, etc. Relevant to the present technology is agent software that performs various functions detailed herein, including overlaying a digital watermark pattern on the display screen 16. The pattern is too faint or subtle to be objectionable to human viewers (if it is noticeable at all). However, this pattern encodes a payload of dozens or hundreds of bits, which serve to convey various information (e.g., an identifier associated with this desktop computer).

The second computer system 18 is a tablet computer. It includes the usual complement of elements, including a camera 20, a touchscreen, a CPU, memory, networking interface, etc. In this exemplary arrangement, computer 18 is used by an IT professional.

Again, the memory of computer 18 includes software and data. Relevant to the present technology is software that performs various functions detailed herein. One of these functions is to processes imagery captured by the camera 20, and to apply a watermark decoding process.

To establish a Helpdesk session with computer 12, the IT professional uses camera 20 of tablet computer 18 to capture imagery including a depiction of the display screen 16 of computer 12. The software in tablet 18 decodes the watermark payload from this captured imagery (i.e., from the depiction of screen 16), and sends the payload data to a remote system 22.

Remote system 22 can include several elements—or even several computers distributed at different locations. In one aspect, remote system 22 includes a database or other data structure that associates watermark payloads with corresponding "payoff" information—information used in providing a response when a particular watermark is encountered. The database may be of general purpose utility, e.g., serving applications as diverse as music recognition and comparison shopping (as detailed in the patent documents referenced below). On the other extreme, the database may serve no purpose other than to provide Helpdesk-related "payoff" data as detailed herein.

In one particular arrangement, when the watermark payload decoded from display screen 16 is provided to the remote system 22, the "payoff" stored in association with the payload is public key data associated with desktop computer 12. This public key information is sent by the database back to the IT professional's tablet computer 18.

As is familiar to artisans, a public key is used in asymmetric cryptography systems—in conjunction with a mathematically-linked private key—to securely exchange information between two users. The public key is used to encrypt plaintext or to verify a digital signature; whereas the private key is used to decrypt ciphertext or to create a digital signature.

Figure 2:
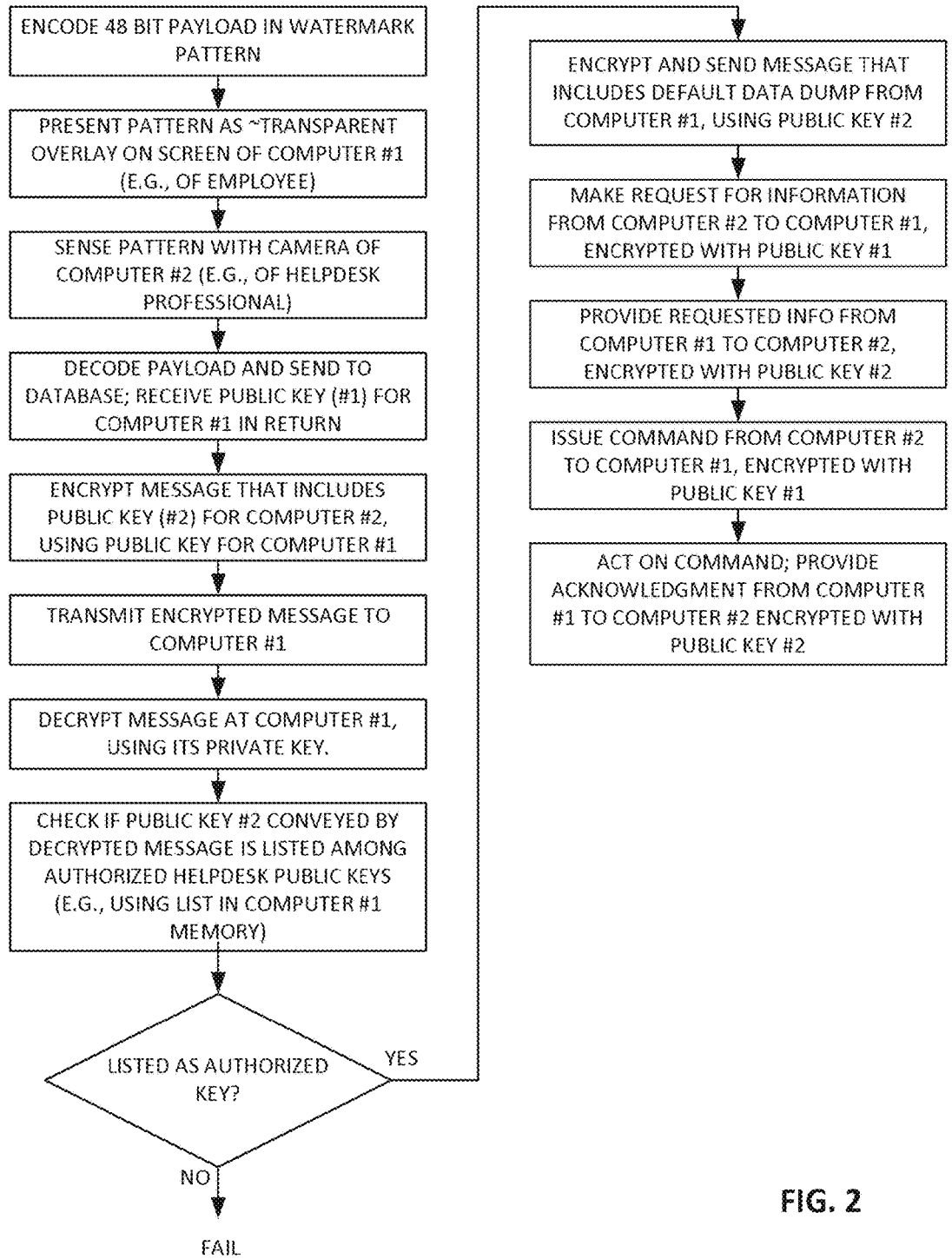
FIG. 2 shows a flowchart detailing certain aspects of the present technology.

As shown in the illustrative method detailed by FIG. 2, the public key obtained from the database is used to encrypt a message that is sent from the IT professional's tablet computer 18 to the employee computer 12. This message includes, in its body, the public key for tablet computer 18.

The software in the employee computer 12 receives this message, and decrypts it using its private key. The memory of computer 12 was earlier loaded with a list identifying public keys of all devices that are authorized to gain Helpdesk access. The public key conveyed in the body of the decrypted message is checked against this key list, to determine whether tablet 18 is authorized. If the key is not found in the list, the process ends—optionally with a message returned to the tablet computer 18, reporting that its public key was not found in the key list stored in computer 12.

If the public key conveyed by the encrypted message is found on the list, then computer 12 recognizes tablet 18 as an authorized Helpdesk computer. Among other possible responsive behaviors, the software in computer 12 prepares a response message containing a dump of various system diagnostic information, such as user information and system information.

Desirably, this response message is encrypted before transmission—this time using the public key for the tablet computer 18 (which was conveyed to the employee computer 12 in the body of the earlier message).

When tablet computer 18 receives this latter message, its software decrypts the message using its own private key. The software then displays the received diagnostic information on the tablet's touchscreen, in a user interface that facilitates review by the IT professional (e.g., presenting summary information in a first screen view, with UI controls allowing drill-down examination of a next level that has more detailed summaries of user information and system information—each permitting further drill-down examination of other information in greater detail).

The IT professional can then engage in further transactions, as needed. For example, the professional can operate the UI of the tablet software to make requests for additional information—not included in the original diagnostic data dump—from the employee computer 12. The software in the employee computer acts on the request, compiling and transmitting the requested information back to the tablet. Likewise, the professional can operate the UI of the tablet software to make configuration changes to the employee computer, such as updating settings and downloading new software. Again, these commands are sent to the employee computer 12, which fulfills the commands in response, and returns an acknowledgement message with any relevant data.

(It will be understood that all communications exchanged between the two systems are desirably encrypted: transmitted messages can be encrypted with the public key of the receiving system, such received messages are decrypted with the private key of the receiving system.)

While the IT professional is engaging in these actions, the employee can continue using computer 12 as before. The IT professional interacts with the tablet touchscreen, leaving the desktop keyboard 14 untouched.

The appearance of the IT professional at the desk of the employee is a physical act that forms an element of a multi-layered security protocol. However, once that act has been performed, and once the authentication of the IT professional has been recognized by computer 12, the IT professional can leave the employee's desk area and continue the Helpdesk session from another location—no longer in the presence of the employee. Yet it is desirable that the employee have some indication of the IT professional's continued session with the employee's computer 12.

Figure 3:
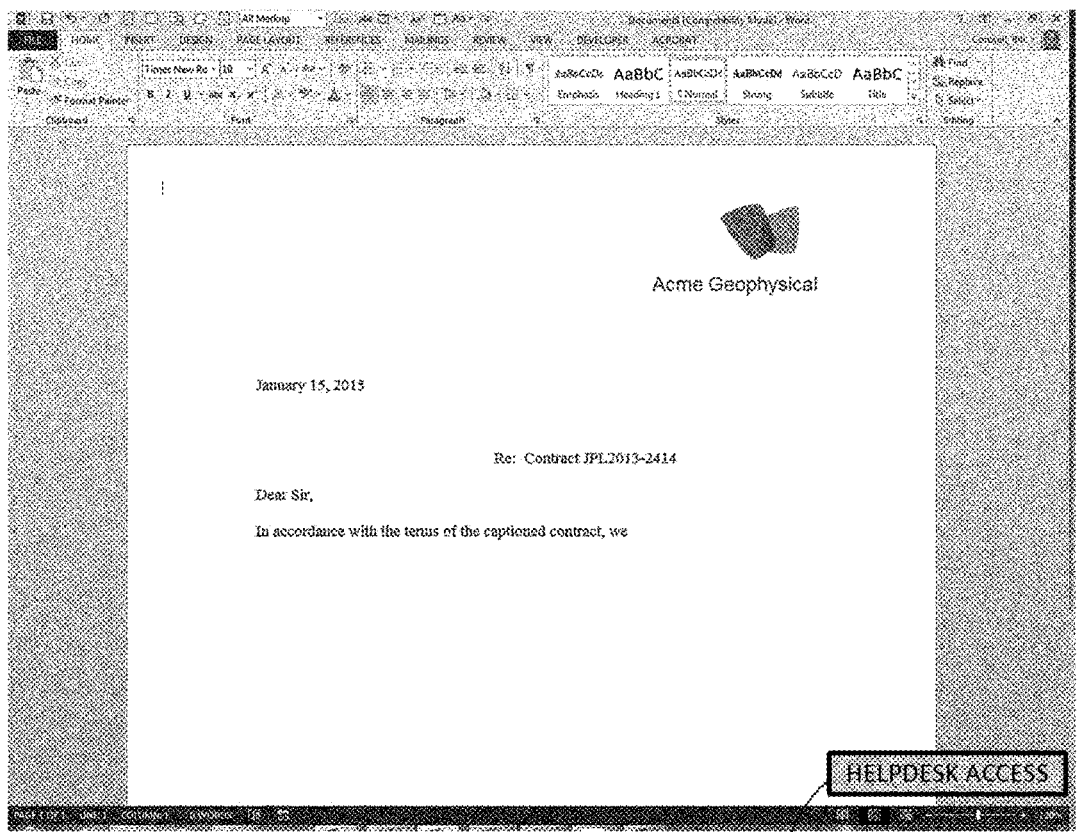
FIG. 3 shows a display presented on a desktop computer screen, while both the employee and the IT professional are working with the computer.

In one arrangement, a dialog box is presented on the screen 16 (atop all other displayed windows so that it is always visible), reporting the continued Helpdesk session. One such box is shown atop the employee's ongoing work in FIG. 3 and includes the text "Helpdesk Access." In another arrangement, the box includes text that changes with status—giving a summary of each action as it occurs (e.g., "Downloading information," "Updating software," etc.). Additionally, or alternatively, an icon can appear in the taskbar that typically runs along the bottom of desktops running the Windows operating system, or in the notification area at the far right of the taskbar, alerting the user to the continuing Helpdesk session.

Just as the software programs in the tablet 18 and the desktop computer 12 cooperate to provide a dialog box on the display screen 16, the cooperating software programs can also present other graphics on the display screen, and otherwise control the operation of computer 12. For example, in response to instructions from the tablet software, the desktop software can present one or more elements of a user interface on the desktop display screen, for manipulation using the tablet. A simple example is an array of buttons, between which the IT professional can select by directing the tablet camera towards a desired button. An algorithm can analysis the desktop's display buffer to identify a region of uniform pixel values, and the buttons can be placed in such region—to minimize disruption to the employee's work. (A watermark-based arrangement for using a mobile device as a mouse to manipulate a UI on a desktop computer is detailed in application Ser. No. 14/597,895, filed Jan. 15, 2015.)

Exemplary Actions

The desktop actions that can be invoked by the mobile computer are unlimited. A representative assortment is detailed in this section.

Many actions involve reviewing diagnostic data and maintenance information, and making any system changes that appear warranted.

Diagnostic data and maintenance information ("diagnostic data" for short) includes any information that pertains to operation of the desktop computer. By way of example and not limitation, such information includes:

Identification of operating system and application software, and related service packs;
Disk and memory information—including model numbers, technical specifications, usage information such as I/O tracking and event errors;
Processor details, such as speed, cache and model, and usage information;
Security settings, including active anti-virus software and local certificates;
User-related data, such as logged-in username, domain, account expiration, password expiration, last password reset, user profiles on that computer, local and group policies, and Organization Unit (OU);
Network settings, including computer name, workgroup(s), MAC address, IP address and default gateway;
Contents of the Windows Registry file;
Programs and services configured to launch on startup;
Display information, including display device and graphic card models, physical display resolution, color depth, and refresh rate;
Locally-installed printers;
Driver and address information for all hardware;
Other information available from Windows Device Manager, Resource Monitor, Event Viewer, ipconfig, and MSConfig programs;

Given the volume of information available, the mobile device software desirably includes UI features that enable sorting and filtering of the information, enabling the Helpdesk professional to quickly drill down (e.g., through topical hierarchies) and locate desired information.

Some actions invoked by the mobile device concern software updates. For example, the agent software on the desktop can be instructed to check for available updates to specified software, and install such updates.

The desktop computer can be rebooted, and an auto-login operation can be performed (again, without touching the desktop keyboard). In particular, the desktop agent software can be instructed to modify keys in the desktop's registry file causing the desktop to auto-login with a specified username and password when it next boots. (The employee's credentials can be used, or the Helpdesk professional's administrator credentials can be entered.) The agent software then causes the desktop to reboot. When it restarts, auto-login proceeds based on the just-stored credentials. The agent software is among the files launched at startup. When launched, it immediately checks the registry to see if auto-login has been set, and if username/password data are stored. If so, it un-sets auto-login, and deletes the stored credential data.

Other actions that can be performed by the mobile computer include running system monitor programs, such as the noted Windows Device Manager, Resource Monitor, Event Viewer, ipconfig, and MSConfig programs. In addition to providing information about desktop operation, these programs can also be used for control purposes, e.g., terminating processes, changing process priority, analyzing network connectivity and making adjustments (e.g., by modifying DHCP and DNS settings), etc.

Another action is to play one or more audio files. The file(s) to be played (e.g., a *.wav or *.mp3) file) can be specified in the agent software, but more usually is identified (e.g., by path and file name) in HTML returned from the remote system 22. The Windows Media Player can be invoked to render the audio, and can be minimized—if desired—so as not to visually appear on the desktop screen. This functionality can be invoked to test operation of audio system components (e.g., sound card and speakers). Alternatively, it can be invoked to stream data from the desktop to the tablet or another computer, e.g., encoded as an audio watermark, or simply modulated as an audio data signal. Data conveyed in this fashion can include additional diagnostic and management information.

The mobile device can also invoke mouse-like functionality in the desktop agent software, which causes the agent to move a cursor on the desktop screen, in accordance with movements of the mobile device (as sensed by 3D accelerometer, gyroscopic, and magnetometer sensors). This functionality is further detailed below.

Additionally, or alternatively, the mobile device can instruct the desktop device to send the content of its display buffer (commonly in compressed form), which is used by the mobile device to present a mirrored rendering of the desktop display on the mobile device screen. Taps and other gestures entered by the Helpdesk technician can then be localized relative to the desktop screen imagery, and corresponding tap and gesture commands can be sent to the desktop agent software to replay on its UI—allowing the Helpdesk technician to remotely interact with the desktop UI.

Yet another action is for the mobile device to send other of its sensor data to the desktop or the remote system 22. An example of such other sensor data is fingerprint data for the Helpdesk technician, as sensed by a fingerprint sensor on the mobile device.

As noted, the foregoing are just a sampling of the actions that can be undertaken by the mobile device.

Additional Detail

In one particular embodiment, the remote system 22 includes a server computer that is used in managing all the computers on a corporate campus, using software such as Microsoft's System Center Configuration Manager (sometimes termed ConfigMgr). This server stores configuration and performance information for all the desktops on the campus. For example, every hour, the server receives from each such computer a dump of diagnostic data, of the sort detailed above. The server also manages access credentials for each computer, and serves as a repository for information such as public key data for each computer.

The remote system 22 also includes a server running the Microsoft Internet Information Services web server. In an illustrative embodiment, this is the same server as noted in the previous paragraph, although different hardware can alternatively be used. This web server is used to serve web page data, such as HTML5, to the mobile device, to present the user interface through which the Helpdesk professional interacts with the desktop computer.

As noted, remote system 22 can also include a database or other data structure that associates watermark payloads with corresponding "payoff" information—information used in providing a response when a particular watermark is encountered. In an illustrative arrangement, this function of resolving watermark payloads to identify associated payoff information is performed by the server(s) just-discussed. In other embodiments, the resolver is a separate server.

Since all of these just-discussed functions may take the form of software running on a single hardware server, the remote system 22 is sometimes simply referred to as "the server."

As noted, the desktop computer has agent software that communicates with the server (or directly with the mobile) to perform the actions detailed herein. Typically, communications between the agent, the server, and the mobile device, are handled through socket connections. The desktop computer can have other software agents that serve related purposes, such as running PowerShell scripts to perform certain data collection and system configuration operations.

In some embodiments, the mobile device can employ a standard browser to perform the operations detailed herein. That is, the present functionality is implemented in web page instructions that are sent to the mobile device by the server, and rendered like any other web page.

Watermarking

The techniques of digital watermarking are familiar to the artisan. Examples are detailed, e.g., in applicant's patent documents U.S. Pat. Nos. 7,088,844, 6,590,996, 6,424,725, 6,408,082, 6,122,403, 20100150434, 20110274310 and 20120046071.

Particular techniques involving digital watermarks presented-on and read-from electronic display screens are detailed in patent documents 20100228632 and U.S. Pat. No. 8,971,567, and in pending patent application Ser. No. 14/522,150, filed Oct. 23, 2014 (now published as 20150278980), and Ser. No. 14/597,158, filed Jan. 15, 2015.

The payloads of watermarks used herein can take the form of literal data, or indices.

Literal payloads directly convey information, such as the hostname of a desktop computer (e.g., pdx-pca-00137). The issue with literal payloads is their length. As noted, the payload capacity of watermarks is limited; a screen often is tiled with identical blocks that convey less than 100 bits of data. (Multiple watermarks can be presented in sequence to convey additional information. For example, pending application Ser. No. 14/180,277, filed Feb. 13, 2015 (now published as 20150227925), details use of "erasure codes" to convey payloads of 1000 bits or more.) The host-name just-given consists of 13 alpha-numeric characters. With ASCII encoding (8-bits per symbol), this hostname takes 104 payload bits to represent.

Literal encoding can sometimes be used to represent "flag bits" to indicate the binary state of a condition. For example, whether a desktop computer has network connectivity can be represented by a single flag bit in a watermark payload, e.g., payload bit 54 may be set equal to "0" to signal that the computer has no network connectivity, and "1" to signal that such connectivity exists. Whether the operating system has recognized a bootable hard disk can be represented by another flag bit. Etc.

Index-based payloads provide for the representation of information of arbitrary length by encoding a short string (e.g., z98Qg). This short string serves as an index into a data structure where associated (longer) information is stored.

In some embodiments, different watermark payloads are presented on the screen of a computer during different phases of a process. In the Helpdesk example, in the initial phase—when the mobile device is first identifying the desktop, and possibly engaging in an authentication process—the watermark payload can be an identifier of the desktop, such as its hostname (e.g., pdx-pca-00137), or its public key (e.g., 2F32-7CA7-62D6-55D4-20F2-E60D-A832-9A1C).

In another embodiment, the initial watermark payload can be a cryptographic challenge, to determine the authorization level of the Helpdesk professional. This arrangement is further detailed below.

The role of embedding the watermark payload into host imagery (e.g., the desktop's Windows-logo "splash" screen displayed on boot-up, or the desktop user's desktop display with windows, etc.) can be performed by different systems, depending on application. In many embodiments, the embedding is performed by software included in—or invoked by—the agent software on the desktop computer. (In some embodiments, screen watermarking is a service that is included as an operating system function.)

In other embodiments, the BIOS software—which is active before the operating system and application programs are loaded—performs the watermarking operation. Watermarking by BIOS is advantageous because it allows watermarking of screens presented immediately after the computer is powered-on, before loading of the operating system and applications software is completed. It is in this early phase of operation that certain problems arise, which Helpdesk professionals are sometimes called-on to resolve. (BIOS software for desktops is commonly provided by AMI, Award or Phoenix Technologies.)

In still other embodiments, watermarking of screen imagery is performed by video card hardware (and associated firmware), which includes a watermark pattern in data written to the bitmapped screen buffer.

In any of the foregoing arrangements, the payload represented by the watermark can be the same each time the computer is operated, or the payload can vary in accordance with parameters of the computer's current operation. An example of the former is an initial watermark that conveys the desktop's hostname identifier. An example of the latter is a watermark that literally represents the desktop's CPU temperature, or fan speed. Such parameter may be written periodically (e.g., every minute, or every second) to a memory cache, from which the watermarking software retrieves it to derive the watermark pattern. If the computer freezes-up, the frozen display screen presents the parameter data from the update interval immediately preceding the lock-up.

In still other embodiments, certain watermarks are encoded by devices remote from the desktop. For example, the bitmapped artwork for the Windows "splash" screen presented at boot-up and log-in may have been watermarked by the server 22 with the desktop's hostname identifier, and stored on the desktop when the desktop was first configured for use at the corporation. In similar fashion, a remote system can provide a watermarking service that produces watermarked bitmaps or other image files—or simply a watermark pattern that can be overlaid on another image file—as needed by the desktop computer. The desktop computer can provide the needed payload to the remote system, or the remote system can determine the payload otherwise.

In some embodiments, screen imagery is watermarked only at certain times. In other embodiments, the screen imagery may always be watermarked. The displayed watermark can be limited to a single frame of payload information, or the watermark can cycle through different frames, to convey longer information payloads.

On-screen watermark payloads can also convey—or index—information such as account names and passwords. Such information, as well as many other types of payload data, are typically encrypted.

In discussing watermarks, it is sometimes helpful to distinguish between two types of scrambling (encryption) that can be used.

The first type of scrambling concerns the (usually spatial) mapping of payload bits to image pixels (or to so-called "waxels"—watermarking elements). Typically, each bit of the payload is manifested as a positive or negative adjustment to values of pixels that are spread pseudo-randomly throughout a square image tile (e.g., of 128×128 pixels). In one case, the adjustment may be made on the basis of waxels that are each 4×4 pixels in dimension. There are 1024 such waxels (i.e., 32×32) in a 128×128 pixel tile. If the payload is 64 bits, then each of these payload bits influences (up or down) the pixel values in 16 different waxels (e.g., a "1" payload bit tweaks pixel values up; a "0" payload bit tweaks pixel values down). This pseudo-random mapping between each bit in the payload, to a scattering of waxels in a watermark tile, is performed in accordance with a "spreading key." In the example just-given, the spreading key takes the 64 bit payload, and generates a corresponding 32×32 array of adjustments (tweaks) that are applied to modify the values of pixels of the host imagery.

The watermark technologies detailed in the above-identified patent documents nearly all employ a spreading key. The spreading key can be kept strictly private—known only to a party who is intended to decode a watermarked graphic, or it can be more public. For example, Digimarc's Discover technology (including the Discover app freely downloadable in the Apple App Store) uses a single spreading key that is used for all items watermarked with the Discover technology. Indeed, such standardization is generally required in order for watermarked items to be widely decodable.

The second type of scrambling concerns encrypting the payload conveyed by the watermark. That is, instead of watermarking information "in the clear" (e.g., representing a fan speed of 7200 rpm as "7200"), the data is first scrambled (encrypted). Such scrambling may lead to a watermark payload of "dTg." A "payload key" is used for such scrambling (and decrypting).

Sometimes a watermark payload is segmented, into different fields. For example, the first ten payload bits may serve as a first field, and be used to represent the CPU temperature; the second ten payload bits may serve as a second field, and be used to represent the fan speed. Different payload encryption keys can be applied to different payload fields.

In one particular embodiment, a watermark payload comprises 1000 bits, forming two fields. The first field is unencrypted, and conveys token data identifying the desktop computer. (Token data refers to one-time use data, which is associated with persistent data—such as the desktop hostname—through a data structure.) The second field is encrypted, and conveys diagnostic information. The payload encryption key is selected by the desktop, which sends it to the server. When the mobile device sends the server the decoded token (i.e., decoded from the unencrypted payload field of a watermark presented on the desktop display), this demonstrates that the Helpdesk professional is physically in front of that particular desktop. In response, the server returns data to the mobile device including the payload encryption key for the desktop identified by that token. The mobile device can then decode the second field of the watermark payload—accessing that desktop's diagnostic information.

(In this and other examples, the creation of encryption keys and tokens can be by the desktop, the mobile device, the server, or another system (e.g., a certificate authority), depending on needs of a particular application. In the example just-given, the encryption key could, alternatively, have been selected by the server, which would send it to the desktop for its use, and send it to the mobile device after receipt of the decoded token data. Etc.)

Security

The topic of security permeates much of this disclosure. Additional information specifically addressing this topic follows.

As noted, it is desirable for each device involved with the present technology to establish a trust relationship with each other such device. Known mutual certification approaches can be used—some of which rely on a certificate authority. (Within a corporate network, the server 12 may serve as a certificate authority.)

It is also desirable for the mobile device to prove that it is physically proximate to (e.g., within sight of) the desktop being assisted (e.g., to defeat "replay" attacks). This can be done, e.g., by presenting a challenge to the mobile device from the desktop, using data that varies each time the challenge is performed. In an example given above, a one-time token is conveyed in payload data of a watermark displayed on the desktop screen. The mobile device must decode this token, and submit it for verification, before subsequent actions are permitted. In other embodiments, the mobile device must perform an action on the challenge data (e.g., digitally-sign it), and the system that performs the verification (e.g., the server to which the mobile device sends the processed challenge data) then confirms that the received information matches what is expected (e.g., that the information can be decrypted with the public key of the mobile device, and is found to match the challenge data).

Except as indicated otherwise, all communication between the various devices involved with the present technology is typically encrypted. A variety of known techniques can be used (e.g., SSL (now TLS), Kerberos, NTLM, RSA rotating codes, asymmetric encryption, etc.).

Much faith is put in the fact that the operator of the mobile device is authorized to undertake the detailed operations. Multi-factor authentication can be used, e.g., requiring that (a) the operator's thumbprint must be swiped, and confirmed—by the server—to be an authorized operator; (b) the operator must enter a personal password (which is again checked by the server); and (c) the MAC address of the mobile device must be checked against a list of devices that this operator is authorized to use. Biometric checking may be required later in the procedure to ensure that the mobile device is still in the possession of the authorized operator.

In some arrangements, all Helpdesk personnel have the same level of security authorization, and enjoy equal privileges on all machines. More typically, Helpdesk staff are tiered. Some personnel (who may be termed Level1) have a relatively low level of authorized access, with limited privileges. At the other extreme, some other personnel (termed Level3) have the top level of access authorization, with unlimited privileges. Between them are Level2 personnel. These different tiers of Helpdesk authorization can be established by different cryptographic authorization keys. A 64 bit key can be issued to Level1 personnel; a 128 bit key can be issued to Level2 personnel and comprises the 64 bit field assigned to Level1 personnel, plus 64 more; and a 256 bit key can be issued to Level3 personnel and comprises the 128 bit field assigned to Level2 personnel, plus 128 more.

The just-described arrangement allows challenge-based determination of the authorization of the Helpdesk professional. A watermarked image can be presented that includes a payload that is segmented into three fields. The first field conveys a first data token encrypted with the 64 bit password; the second conveys a second data token encrypted with the 128 bit password; and the third conveys a third data token encrypted with the 256 bit password. The mobile device applies its authorization key, using the different key bit fields to decrypt the different watermark fields. If a Level1 authorization key is employed, only the first data token is successfully decrypted; if a Level2 authorization key is employed, the first and second data tokens are successfully decrypted; if a Level3 authorization key is employed, the first, second and third data tokens are successfully decrypted. Thus, the ability to decrypt the different parts of the watermark payload indicates the authorization level of the Helpdesk professional. (Verification of successful decryption involves the mobile device digitally-signing the decrypted token(s), and sending the resulting data to the server for checking against the known token values.)

Security threats are somewhat constrained when the desktop, the mobile device, and the server, are all on a common network (e.g., a corporate network), firewalled from public access. Things become more complicated when one or more of the components communicates with another across a link outside the closed corporate network, e.g., using an LTE cell phone data service. One approach is to establish a DMZ outside the corporate network, restricted from aspects of the public networks, to which inbound traffic coming across any public link is directed. Such data is deposited at a proxy server (or, more accurately, a reverse-proxy server) in the DMZ, and then sent by that server into the corporate network. The same approach may be used between different secure networks, as may be present, e.g., on different floors of a hospital, at different buildings on a corporate campus, in different security zones in a government facility, etc.

VPN and encrypted tunneling can also be used to establish secure communication between a device off a secure network (e.g., a mobile device on an LTE cellular data network) and a device within the secure network.

Thus, it will be recognized that the present technology can be practiced in heterogeneous environments—spanning multiple networks.

Tokens were referenced above. Candidate data for tokenization includes any of: data that is encoded in the watermark; data that is exchanged between the mobile device and the server; data that is exchanged between the desktop and the server; and data that is exchanged between the desktop and mobile (if any). In addition to the security benefit that one-time tokens provide (e.g., if intercepted, they quickly lose their utility), they also can serve as a form of watermark payload index—allowing a large amount of information to be represented by a shorter token datum.

One way of creating tokens is to append the current date/time, to device- or user-specific information (e.g., the desktop hostname or fan speed), and then hash the result.

Another Particular Embodiment: Sysmouse (For clarity of presentation, the following discussion focuses on the end user functionality of an illustrative embodiment, termed Sysmouse. It will be understood that any of the different watermarking and security features detailed elsewhere in this disclosure can be employed in the below-detailed arrangements.)

Figure 5:
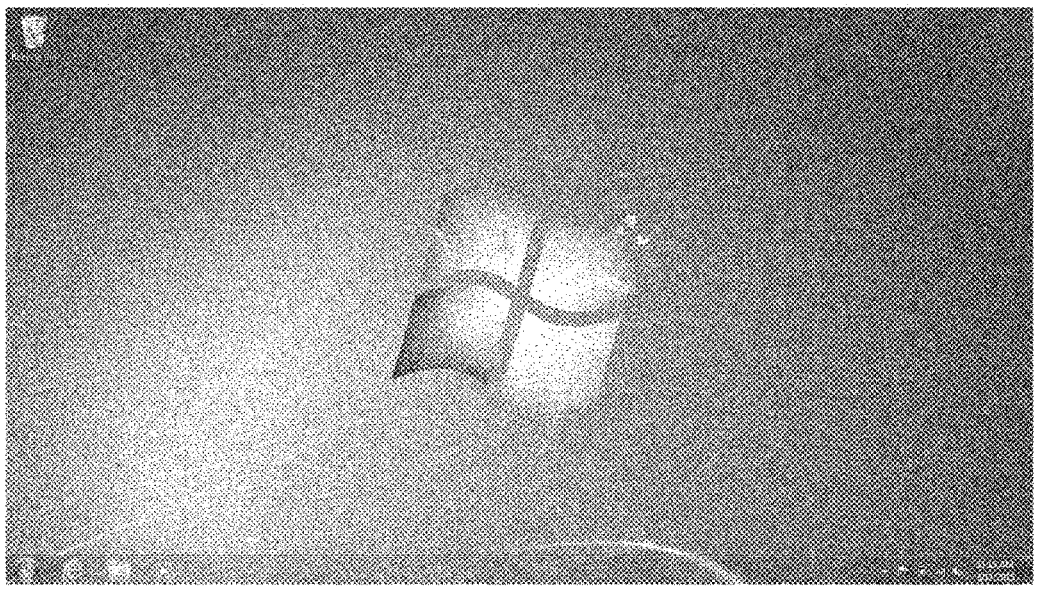
FIG. 5 shows a watermarked screen on a display of a computer, conveying a steganographic multi-bit payload.

FIG. 5 shows the visual desktop of a laptop computer (the "target machine"), displaying artwork including the Windows logo and background. Present, although not apparent, is a watermark payload encoded in the desktop artwork.

Figure 6:
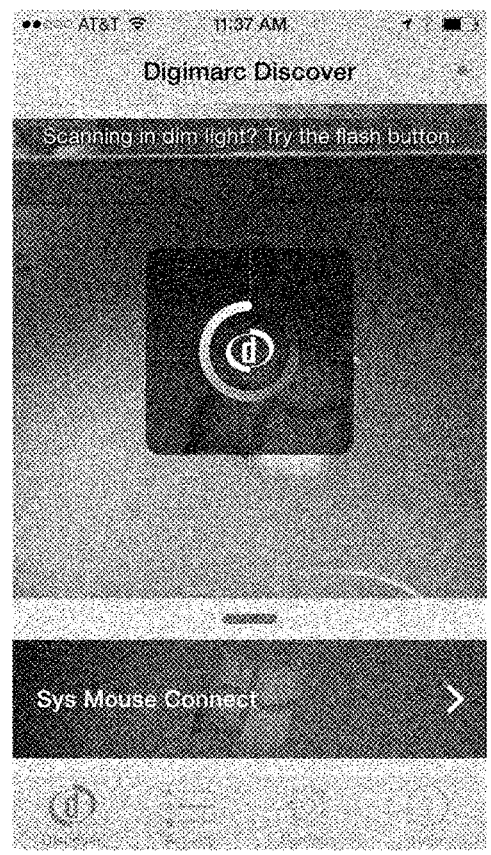
FIG. 6 shows the user interface of the Digimarc Discover app on a smartphone, after capturing an image of the FIG. 5 display.

As noted earlier, the Digimarc Discover app can be run on a mobile (client) device and used to respond to the watermark hidden in the FIG. 5 desktop. FIG. 6 shows the user interface of the Digimarc Discover app a moment after it has captured an image of the FIG. 5 desktop and decoded the watermark payload. The app sends the payload to a resolving server (e.g., computer 22), which provides HTML5 code (or a link to another repository of such code) back to the mobile device in response. A further instant later, the mobile device executes the HTML instructions, yielding the user interface shown in FIG. 7.

Figure 7:
FIG. 7 shows a user interface display presented after the FIG. 6 user interface display, including a single button.
Figure 8A:
FIG. 8A is an enlargement of the lower right corner of FIG. 8.
Figure 8:
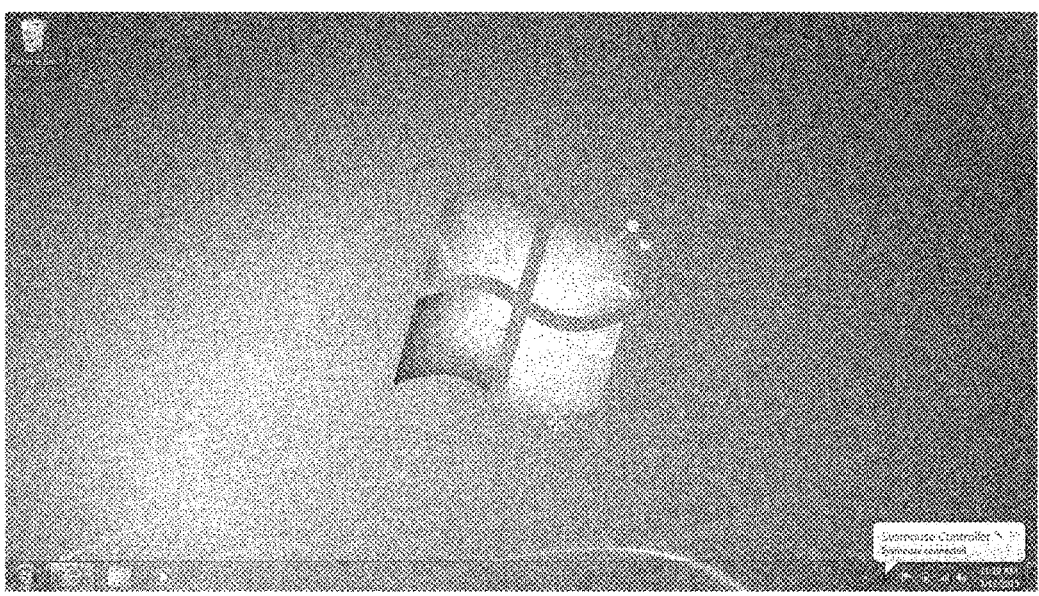
FIG. 8 shows the computer display of FIG. 5 after the button of FIG. 7 has been touched.

The FIG. 7 user interface includes a single button, bearing the label "Connect to machine: pdx-lapa003361.corp.digimarc.com." When the user taps the FIG. 7 button, a session with the laptop computer is started. More particularly, the HTML code on the mobile device reports the button tap to the server, which sends instructions to the laptop causing it to launch the agent software. The user of the laptop is alerted of the "Sysmouse" session by a balloon notification shown in the lower right of FIG. 8 (and enlarged in FIG. 8A).

(Code for this, and other of the described functionality, is included in the Appendix, discussed below.)

Figure 9:
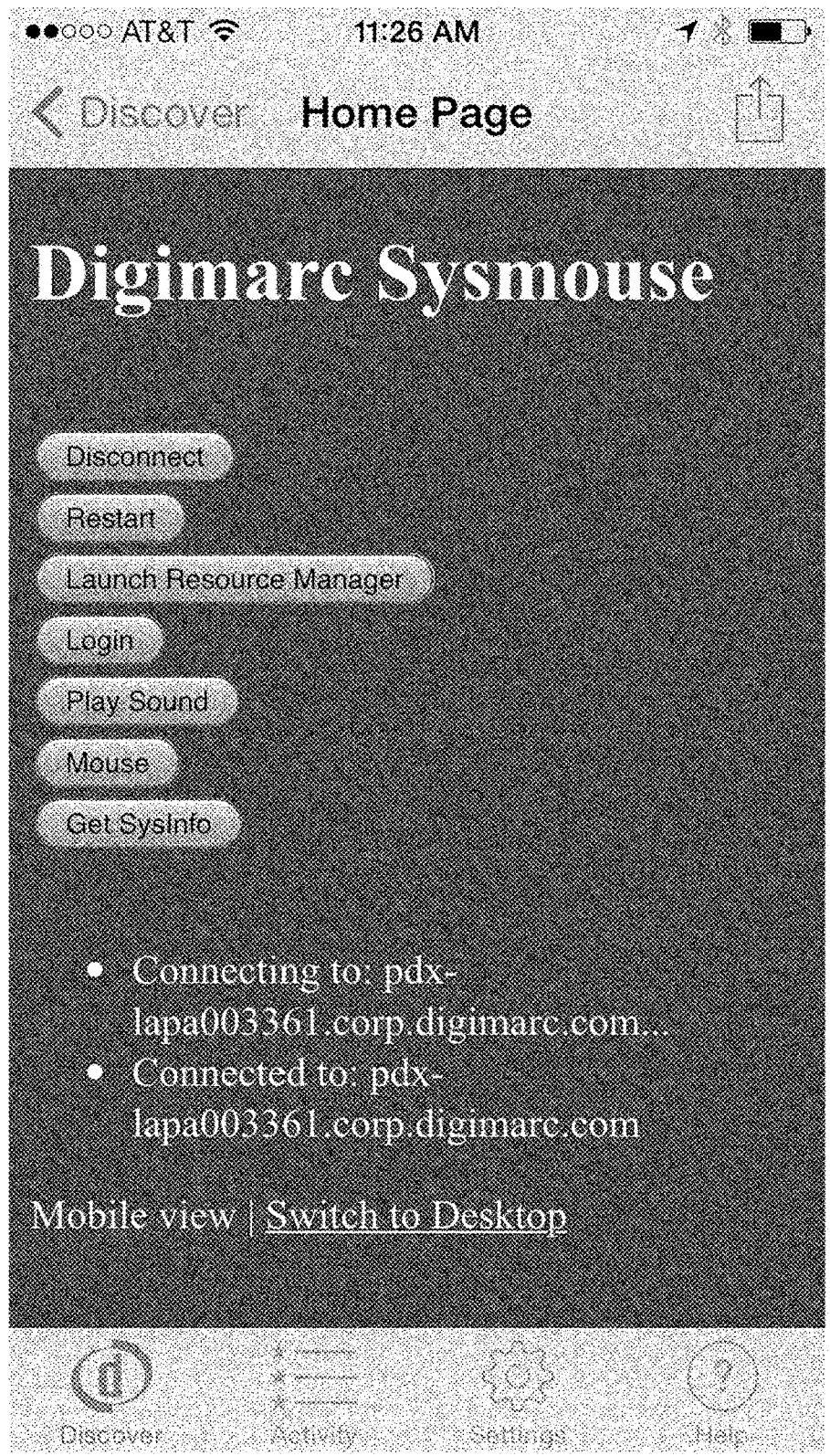
FIGS. 9 and 9A shows a user interface display presented on the smartphone after the button of FIG. 7 has been touched.

Also in response to the user's tap of the FIG. 7 button, the HTML repository 22 serves instructions to the mobile device causing it to present the user interface of FIG. 9.

Figure 9A:
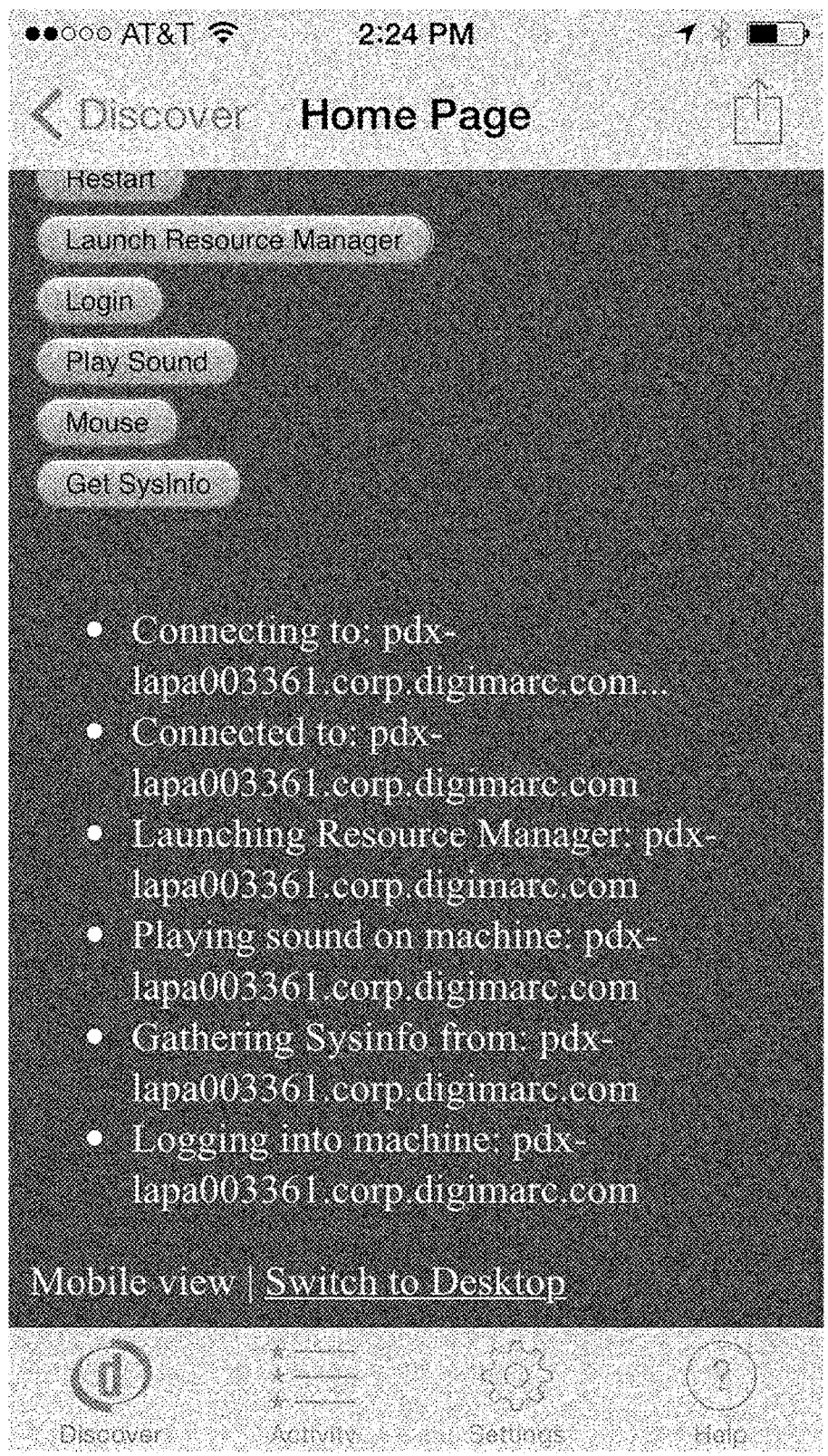

The FIG. 9 user interface includes plural buttons. It also includes a log of actions taken in the session, so far. (FIG. 9A shows the log later in the session, after it has been scrolled to reveal the latest entries—causing some of the buttons to scroll off the top of the screen.)

One of the FIG. 9 buttons is labeled "Disconnect." This ends the Sysmouse session. More particularly, it causes the mobile device to send data to the server, which triggers the server to issue a Windows Communication Foundation (WCF) request to the agent hosting the WCF service on the laptop, causing the agent software on the laptop to terminate.

Another of the FIG. 9 buttons is labeled "Restart." This causes the laptop to restart (just as the user could do using the Windows keyboard key, and selecting Restart from the resulting menu of, e.g., Switch user/Log off/Lock/Sleep/Hibernate/Shut down). More particularly, in response to a user tap of the Restart button on the mobile device, the server sends a WCF request to the agent software. The agent software responds by executing .NET code instructing the laptop to restart.

Figure 10:
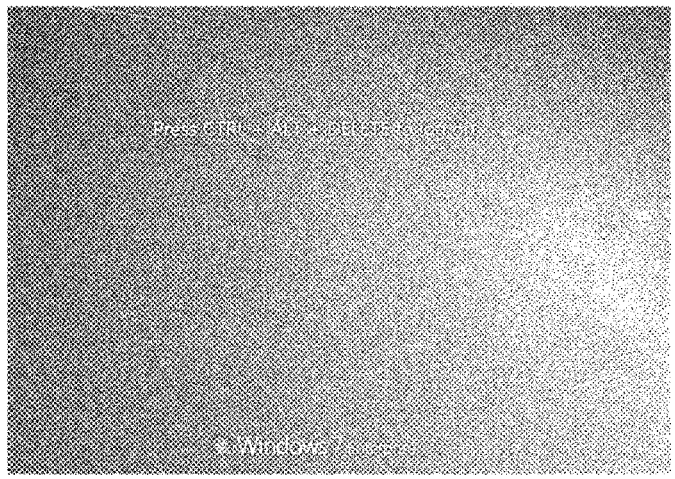
FIG. 10 shows a screen presented on the FIG. 5 computer, after the computer has been restarted by touching a "Restart" button in the FIG. 9 user interface.
Figure 11:
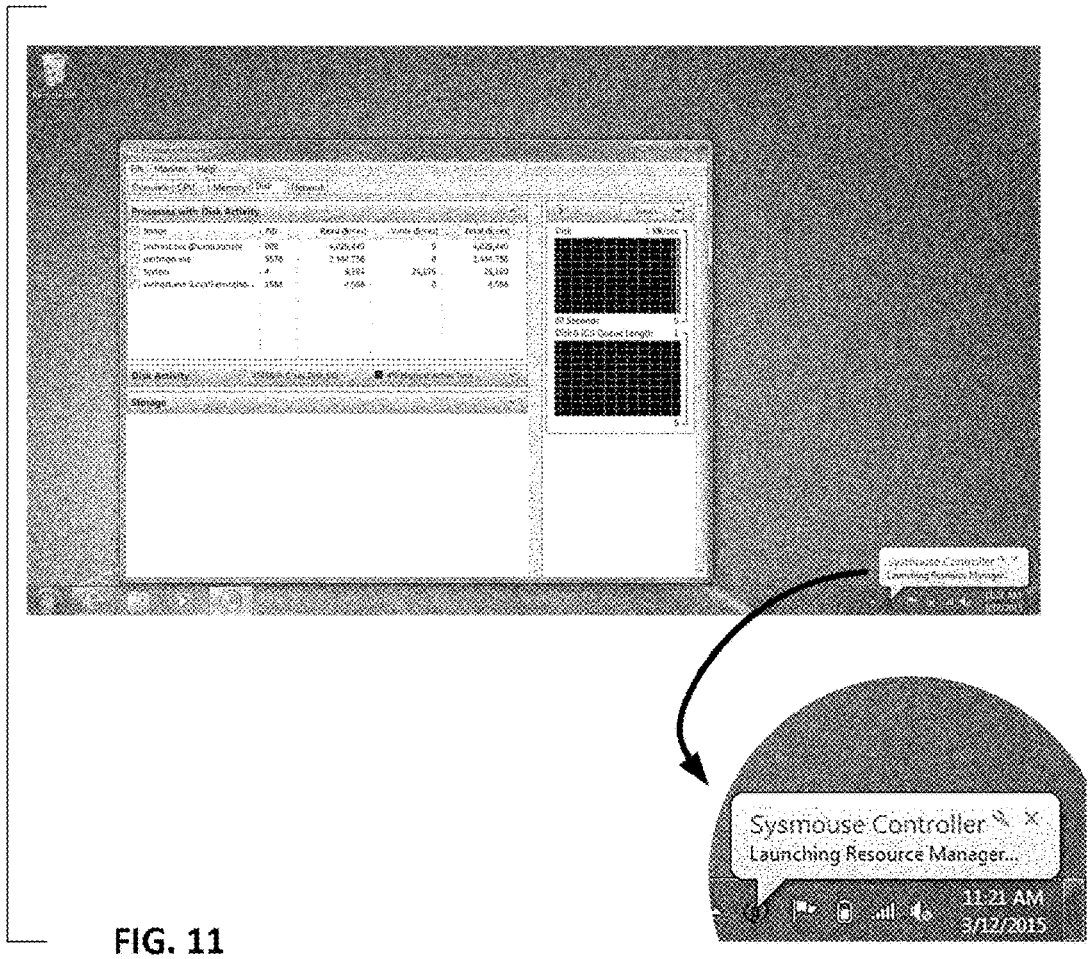
FIG. 11 shows a screen presented on the FIG. 5 computer, after a "Launch Resource Manager" button in the FIG. 9 user interface has been touched.
Figure 12:
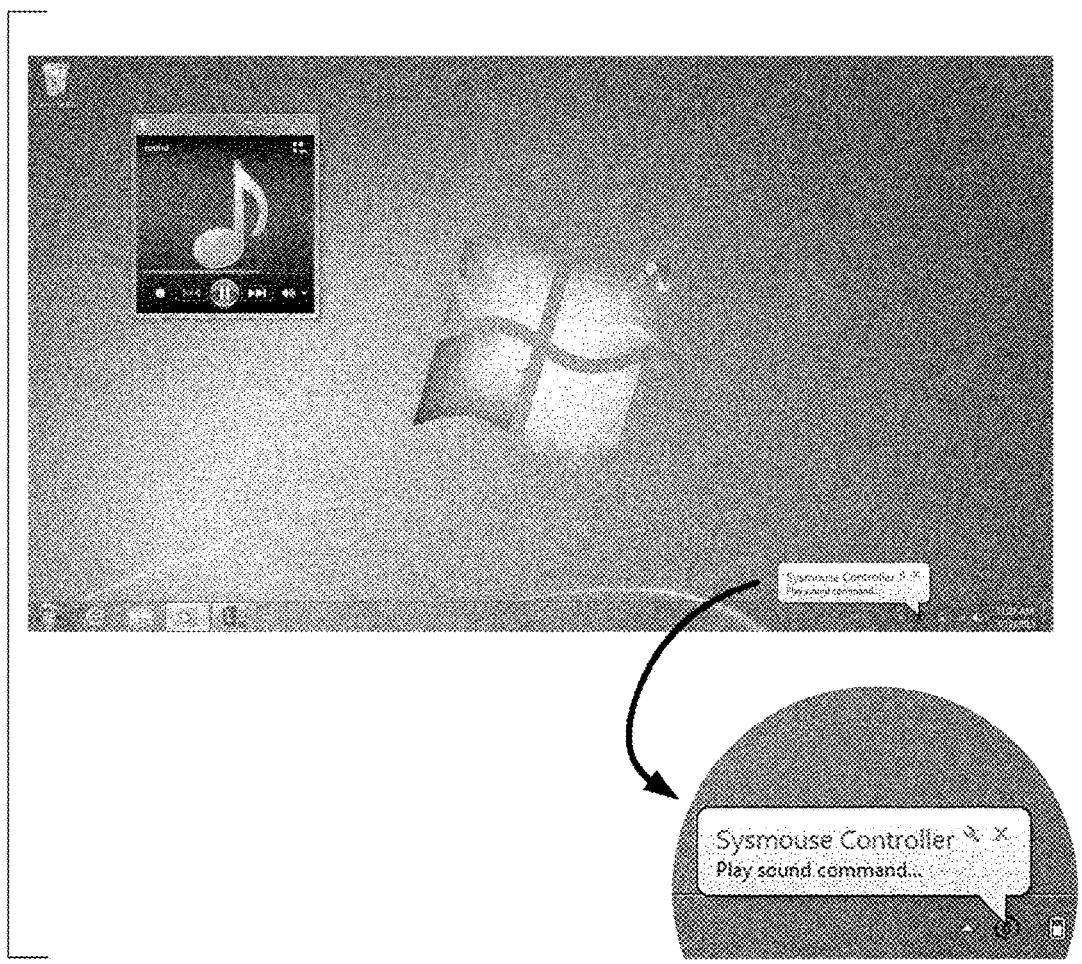
FIG. 12 shows a screen presented on the FIG. 5 computer, after a "Play Sound" button in the FIG. 9 user interface has been touched.

After the laptop restarts, a screen like that shown in FIG. 10 is presented to the laptop user, inviting a Ctrl-Alt-Delete sequence to login with a user name and password.

Another of the FIG. 9 buttons is labeled Login. This is similar to Restart. However, instead of leaving the laptop in a condition where a user must log-in (FIG. 10), this option actually provides log in credentials and returns the laptop to its logged-in condition, as discussed earlier. The Sysmouse session continues, as before.

Another of the buttons is labeled "Play Sound." This button causes a specified "wav" file to play on the laptop, using whatever application program is associated on the laptop with the audio file's type extension. The particular file to be played can be specified in the WCF instructions passed to the agent software on the laptop. Alternatively the file can be identified solely by the agent software itself (e.g., hard-coded in the .NET instructions).

Another of the buttons is labeled "Launch Resource Manager." This button causes the server to send a WCF request to the agent software, triggering a .NET instruction that launches the Microsoft Resource Monitor program on the laptop.

Another of the buttons is labeled "Mouse." This button causes the cursor on the laptop to be controlled based on the 3D pose of the mobile device, as sensed by its pose (or motion) sensors.

In the exemplary embodiment, the cursor is sent traveling in an upward direction on the laptop screen by tipping the top end of the mobile device (i.e., the earpiece end of a mobile phone) downwardly (with the screen facing up). Motion of the cursor is arrested by bringing the phone to a level (horizontal) pose. Similarly, movement of the cursor in a downward direction on the laptop screen is triggered by raising the top end of the mobile device up, with cursor motion again being terminated by restoring the mobile device to level. The speed of cursor movement is proportional to the degree of tipping, with slighter tips/raises yielding slow cursor movements.

Similarly, rightward movement of the laptop cursor is initiated by tilting the mobile device from a horizontal pose to the right. Conversely, cursor movement to the left is achieved by tilting the mobile device to the left. The cursor becomes stationary when the mobile device is restored to level.

Figure 13:
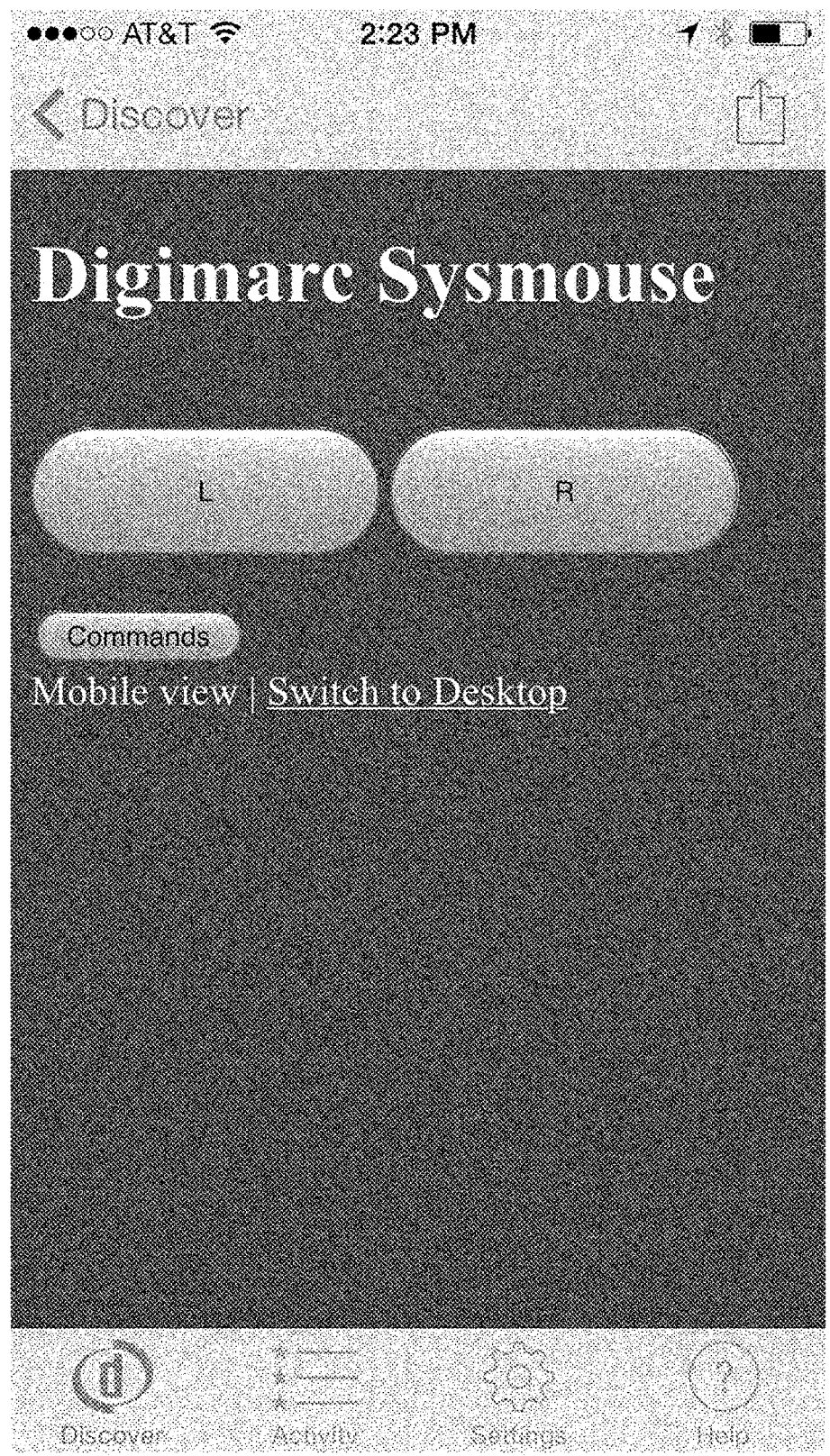
FIG. 13 shows left and right mouse buttons displayed on the smartphone, after a "Mouse" button in the FIG. 9 user interface has been touched.

When the FIG. 9 "Mouse" button is tapped, the screen of the mobile device changes to present Left and Right mouse buttons, as shown in FIG. 13. Touching the Left or Right on-screen button has the same effect as touching the left or right button on a mouse connected to the laptop.

For example, after the mobile device has invoked the Resource Monitor on the laptop, the mouse functionality can be used to position the laptop cursor at any of the controls on the Resource Monitor UI. Thus, the cursor can be positioned over the "CPU" tab, or the "Memory" tab. With the cursor so-positioned, the Left on-screen button presented on the mobile device can be tapped to view CPU or Memory information using the Resource Monitor program.

The mobile device can be placed on a desk or other horizontal surface for such button operations, to avoid inadvertently moving the laptop cursor from its intended position.

Figure 14:
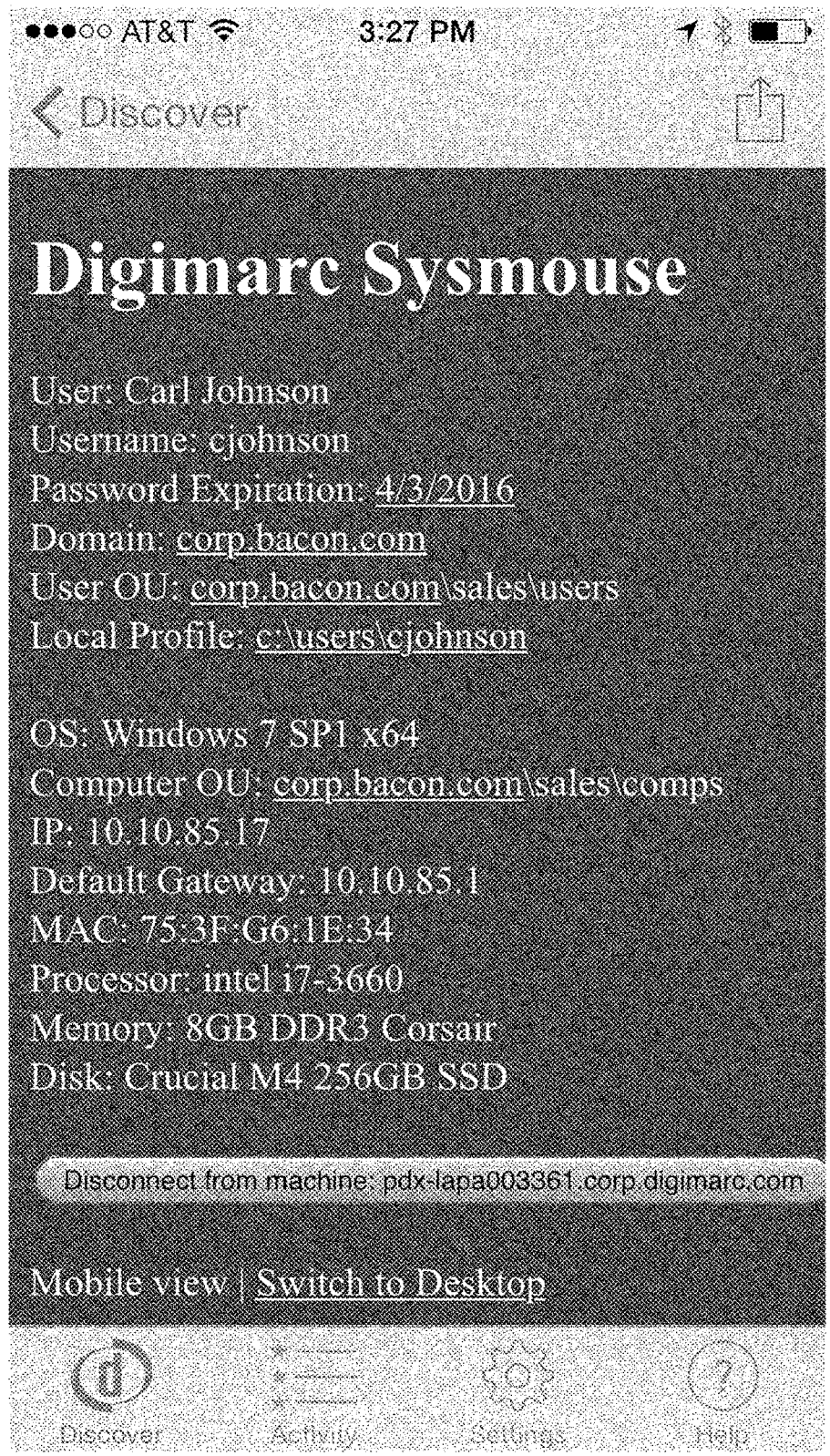
FIG. 14 shows a user interface display presented on the smartphone after the "Get Sysinfo" button in the FIG. 9 user interface has been touched.

The final button shown in FIG. 9 is labeled "Get SysInfo." Touching this button causes the laptop to provide a listing of system information for review on the mobile screen, as shown in FIG. 14.

As in the other examples, touching of the FIG. 9 "Get SysInfo" button sends a report of the event to the server. The server sends a WCF request to the agent software on the laptop, requesting it to perform the Get SysInfo function. In response, the agent software launches the .NET code corresponding to this function. The resulting information is returned to the server, which uses this data to create a corresponding HTML page. That page, or a link to it, is sent to the mobile device for rendering with its web browser.

Figure 15:
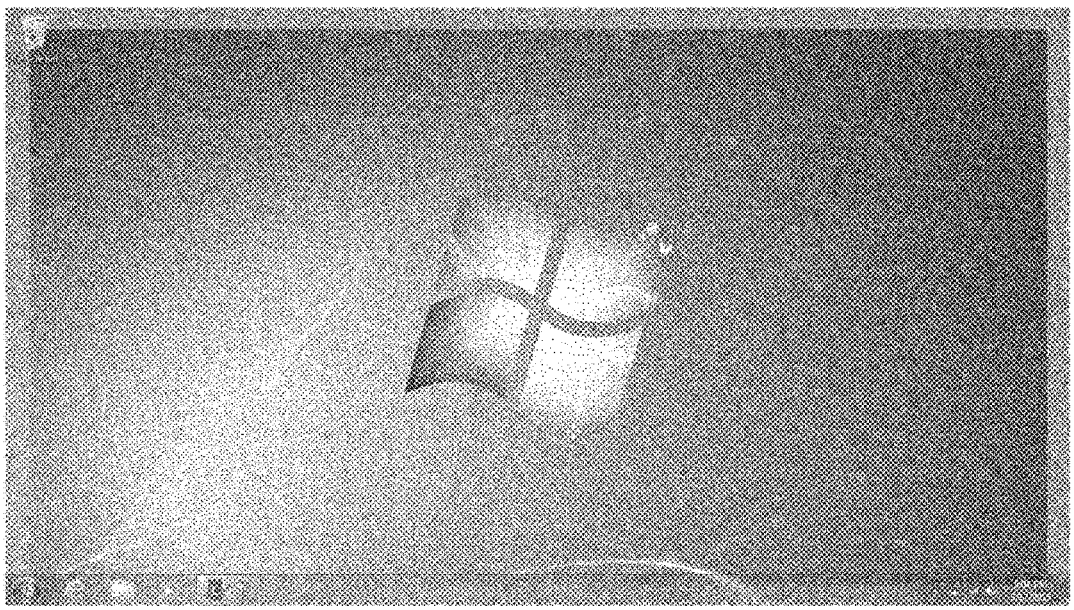
FIG. 15 illustrates that agent software running on a computer presents a colored border around the desktop artwork, to alert a user of the computer that a Helpdesk professional has been sent diagnostic data from the computer.

As part of this function, the agent software also presents a green border around the desktop artwork (FIG. 15) to alert the laptop user that the Helpdesk professional has been sent diagnostic data.

As discussed earlier, the type and amount of such diagnostic data depends on how the system is configured. The information displayed is illustrative only; a great variety of other information can alternatively be presented.

There is other functionality that can be invoked by the mobile device by shaking the device, rather than tapping an on-screen button. Data from motion sensors in the phone is compared against a threshold value, and if the value is exceeded, an action is triggered. Any of the above-detailed functions can be triggered, or other functions. In the exemplary embodiment, the triggered action is Play Sound. That is, when the phone is shaken, the mobile device issues a postback that fires the PlaySound event (i.e., the equivalent of clicking the Play Sound button).

Figure 16:
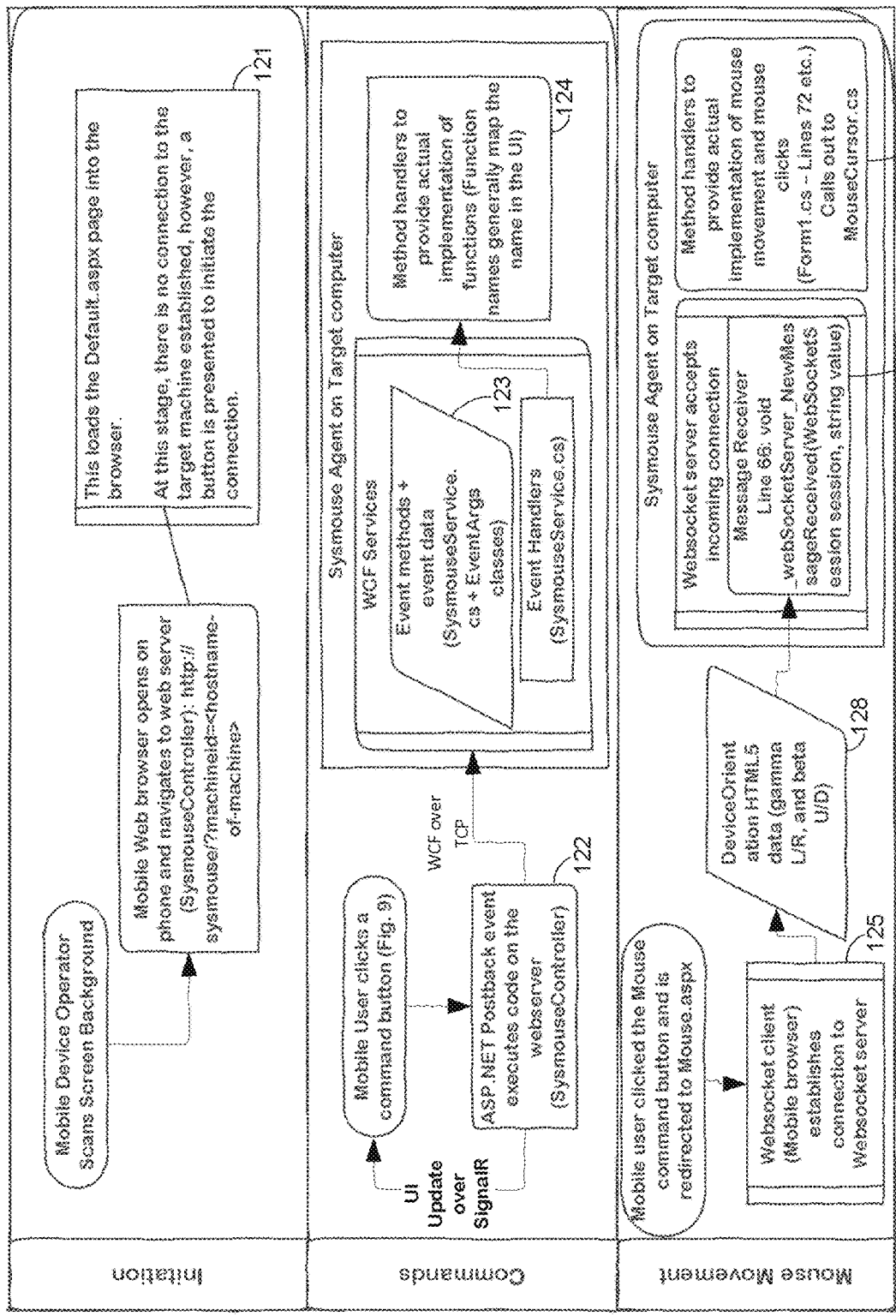
FIG. 16 is a diagram of some of the data flow and software used in an illustrative embodiment.

FIG. 16 is a diagram of some of the data flows and software used in the above-detailed arrangement. The reference numerals refer to code in the Appendix that is used in performing the detailed functionality.

Within Code 121 (i.e., lines 33-68) is the code that triggers an action by shaking the mobile device, noted above. (This code is open source, from the arcgis-dot-com web site.)

Code 123 (the SysmouseService agent code on the laptop) is followed by Code 123*a*, Code 123*b*, and Code 123*c*, detailing arguments involved with certain of the FIG. 9 button functions. Code 123*a*, for example, passes the path to the *.wav file that is to be played. Code 123*b* is used to present the balloon text alerting the laptop user to what's going on. Code 123*c* swaps the desktop artwork with the similar but green-bordered image of FIG. 15.

Code 127*a* is the Form1 code. Code 127*b* is the Mouse-Cursor code.

More on Mouse Operation

Unlike other functions—which involve the server as an intermediary, the FIG. 9 Mouse function opens a bidirectional session between the mobile device and the agent software on the laptop, using WebSockets (RFC6455). The data communicated over this bidirectional channel is a JSON string (JavaScript Object Notation) that communicates various pieces of information. One is "gamma" data, signaling movement left or right. Another is "beta" data, signaling movement up or down. Another is a simple string of "L" or "R," which represents a left click or a right button click.

In the illustrated embodiment, the mobile device does not track where the cursor is, on the laptop screen; it simply sends gamma and beta data—signaling how the cursor should be moved from its current location. The agent software on the laptop repeatedly takes the current x,y cursor position (in screen pixels) and modifies it using the just-received gamma and beta data from the phone.

Code 128 in the Appendix details the generation of the gamma and beta data on the mobile device. Essentially, the code repeatedly checks the phone's tilt—in degrees, in the x- and y-directions. Each of these values is compared against a threshold value of 5 degrees. If the tilt is less than 5 degrees, no data is sent. If the 5 degree threshold in a direction is exceeded, then that tilt datum is reduced by 5 degrees (to smooth operation) and is sent to the agent software on the laptop, which repositions the cursor accordingly. (See, e.g.:

MouseCursor.SetCursorPos(p.X+deltaX, p.Y+deltaY);

in Code 127*a*, first page, line 80.)

As noted, the mobile device can be placed on a horizontal surface to avoid unintentional cursor movements during a Left- or Right-button tapping operation. But other arrangements can also be employed.

One is to signal left and right mouse clicks by movement of the phone in the "z" direction, e.g., up to signal a left click, and down to signal a right click. The movement can be tested by one or more thresholds, e.g., requiring more than two or three inches over vertical movement within a short interval (e.g., less than 500 or 1000 milliseconds) in order to be interpreted as a left or right button click.

Another is to use speech recognition software in the mobile device, which responds to the spoken words "Left" or "Right" by issuing corresponding a button click signal. (The spoken word "Select" can be interpreted as an instruction to issue a left button click signal.) Such speech recognition and button clicking functionality can alternatively be provided by the agent software on the laptop—assuming the Helpdesk professional is in proximity to the laptop.

Still further, the user of the mobile device can issue a command that changes the device from a cursor-moving mode to a button-pressing mode. In response to such a command, the mobile device no longer sends out the gamma and beta data that causes cursor movement. The user can then operate the on-screen Left and Right buttons without worry of jostling the cursor position.

Such a command can take various forms. One is to press a button on the mobile device. A particular button press may be required (e.g., the Home button on the iPhone device), or actuation of any button may suffice (e.g., including volume buttons, etc.). Another command is to shake the phone. Before being interpreted as a cursor control command, the motion sensor data can be tested to assure that it is below threshold values. If a strong movement of the phone—inconsistent with the fine positioning typically associated with cursor movement—is sensed, that signal is interpreted as a command to interrupt further gamma/beta data transmissions. Yet another such command is by a spoken instruction, such as "Button," recognized by speech recognition software. After any such command, the user can freely move the phone without further moving the cursor. The on-screen Left and Right buttons can then be activated, as desired.

(So-called "air mouse" technology is described in various publications by Hillcrest Labs, including patent documents 20050174324 and 20070113207.)

Further Remarks

Desirably, authentication of the tablet 18 to the desktop computer 12 involves verifying physical presence of the tablet in proximity to the desktop, without interrupting the employee, and without using the employee's keyboard. In the above-detailed arrangement, this was done by a short range visual technique—sensing information steganographically encoded on the desktop computer screen. However, other techniques for verifying physical presence can also be used.

One such further technique employs audio issued by the desktop computer. For example, a speaker of the desktop computer can emit a white noise signal in which information is encoded as an audio watermark—just like the screen in the earlier example. Or such information can be encoded in ultrasonic audio signals emitted from the computer. Yet another technique is by a short range radio signal (e.g., Bluetooth or Zigbee) emitted by the desktop computer. The computer may be equipped with a beacon module that emits such a signal, conveying an identifier to the tablet.

Figure 4:
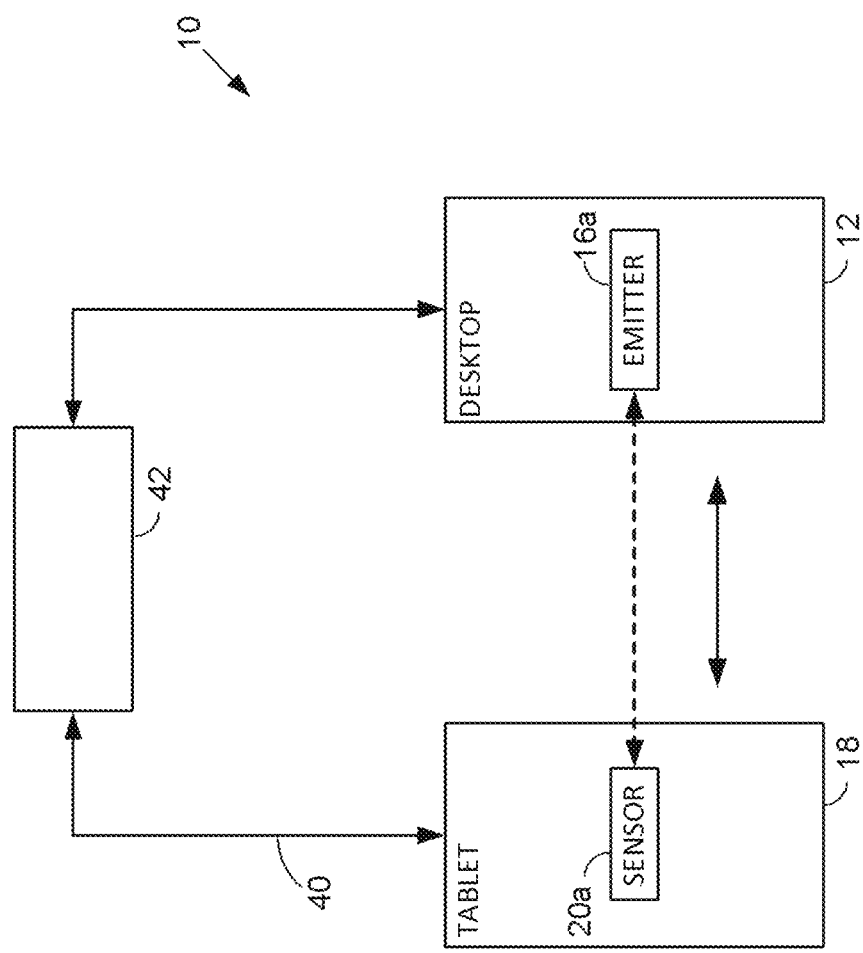
FIG. 4 depicts another embodiment employing certain aspects of the present technology.

FIG. 4 shows the arrangement of FIG. 1, generalized to encompass such alternatives. The desktop computer 12 issues a signal using an emitter 16*a* (e.g., a screen, speaker, Bluetooth beacon, etc.), and the tablet computer 18 includes a sensor 20*a* that detects such signal and extracts identification data.

The precise meaning of "physical presence" depends on the particular system designer. Whether the IT professional must momentarily move the camera of the tablet computer to within two feet of the screen, or within six feet of a computer speaker, or eight feet of a Bluetooth beacon, depends on parameters that can be established by suitable design and selection of the component technologies (e.g., by the resolution, in watermark-elements-per-inch, of the watermark displayed on the desktop computer screen, in conjunction with the resolving power of the tablet camera; the output power of the audio signal or wireless beacon, etc.). Generally speaking, eight feet or less may be taken as a representative threshold of the tablet and desktop computer being in "proximity."

While some of the communication between desktop 12 and tablet 18 is by a direct, short range communication (e.g., screen imagery, audio, or wireless), other of the communication can pass by one or more other channels. This is shown in FIG. 4 by link 40, which passes data between the computers along a different physical channel, such as a wired or wireless network, passing through one or more devices 42 (e.g., routers, servers, databases, etc.) along the way.

The authentication process can include two or more phases that are reliant on the tablet being in physical proximity to the desktop computer 12. For example, the tablet can receive an identifier emitted from the desktop, and determine the public key of the desktop, and use it to send the tablet's own public key—as described above. But instead of immediately providing the initial diagnostic data, the desktop computer can challenge the tablet by presenting new, second information in the on-screen watermark payload—information that varies with each session (avoiding a so-called "replay attack"). This second visually-conveyed information must be sensed by the tablet, and evidence of receipt provided to the desktop, before the desktop regards the tablet as authenticated. (This evidence can include providing the decoded second information back to the desktop. Alternatively, the tablet can return a digital signature, in which the decoded second information (or information based thereon, such as a hash) is encrypted using the tablet's private key. The desktop can decrypt this information with the tablet's public key (earlier provided), and confirm that the conveyed information corresponds to the second information newly presented on the screen.)

Such transactions authenticate the tablet to the desktop. Although arguably less important, the desktop can also be authenticated to the tablet, yielding mutual certification. This can again involve a challenge-response transaction. For example, the tablet can send a random number to the desktop, encrypted with the desktop's public key. The desktop must decode this message (using its private key), hash it with an algorithm based on the current date or time, re-encrypt the results using the tablet's public key, and return it to the tablet. The tablet decrypts this returned message with its own private key, and confirms that the received hash matches one it computes independently, based on the earlier-sent random number.

A further element of authentication is for the individual IT professional to establish his or her own authorization to engage in the transaction. Various methods of such authentication are known. A preferred technique employs two-factor authentication, with the professional demonstrating something they have (e.g., fingerprint) and something they know (e.g., a password).

The tasks of collecting diagnostic information on the desktop computer, and issuing reconfiguration instructions and further commands, can be performed (in Windows) by Microsoft PowerShell scripts. As is familiar to artisans, PowerShell is a task automation and configuration management framework that includes a scripting language, built on the Microsoft .NET framework. Scripts are composed of cmdlets, which are specialized .NET classes implementing particular functions. Several predefined scripts can be included in the software resident on the desktop computer, e.g., to obtain the initial dump of diagnostic information. Other scripts can be run as needs dictate. (A Wikipedia article for Windows PowerShell is attached to application 62/104,291, and provides further information on such technology. The artisan is presumed to be familiar with such details.)

The presentation of a watermark on the screen can be effected by application software (e.g., which can overlay a window across the entire screen, presenting a low opacity watermark pattern), by the operating system (e.g., BIOS code that impresses a subtle pattern on imagery written to the display buffer), by video driver electronics (e.g., the video chipset may alter the image data to introduce the steganographic watermark pattern), or by physical marking (e.g., the surface of the glass display screen can be subtly textured to introduce a computer-discernible pattern in the rendered screen imagery).

Phone as Bridge, Etc.

In accordance with a further aspect of the technology, a smartphone can be employed as a bridge between two computers.

In an illustrative arrangement, a user's home computer needs attention. The issue can range from minor (updating software) to severe (the operating system won't load). Often, the problems of home computer users involve network connectivity.

The user employs his smartphone to call a support technician, e.g., associated with the internet service provider (such as Comcast). The technician instructs the user to run pre-installed software on the computer that will cause it to reach out and contact a diagnostic server at Comcast. If such connection is established, the Comcast technician can proceed with handling the user's issues in conventional remote-access manners.

However, the trouble may prevent the computer from successfully connecting with the Comcast server in the usual manner.

In this case, the technician can instruct the user to capture a picture of screen imagery from the computer, using a Comcast app on the smartphone that both captures imagery and decodes watermark data (like the Discover app referenced earlier).

The information conveyed by the watermark is then used to initiate a process in which a variety of physical communication channels to the computer (e.g., in the OSI model sense) are investigated, to find a best available channel for interacting with the computer. In the process, information about operation of the computer—or other elements of the user's home network—may be discovered.

In one particular embodiment, the screen of the computer is watermarked with a payload that enables devices to communicate with the computer (e.g., address information). Depending on implementation, this can include any or all of public (external) IP address, private (internal) IP address, port information, and MAC address. (Other information, e.g., of the sorts detailed earlier, can be indicated by the watermark payload as well.)

A threshold datum for use in diagnosis is whether a watermark is found in the captured screen data. If it is not, then such information helps the Comcast technician identify candidate problems.

Assuming the watermark is successfully decoded from the captured imagery, the app software on the smartphone uses the phone's cellular data service (e.g., 4G LTE) to send some or all of the decoded watermark information to Comcast. (Smartphones routinely have the capability to engage in phone calls and internet data services simultaneously, so-called "voice+data," enabling this data exchange to be made while the user is still on a voice call with the technician.)

The smartphone app then moves to a next phase of operation—testing connectivity of the computer within a local network.

In many home networks, the output from a cable modem connects to a wireless router, which provides multiple wired LAN connections, as well as wireless connections to nearby devices. This next phase of operation involves trying to communicate with the computer from wholly within the local network. The app software on the smartphone tries to ping the user's computer, e.g., with private IP address data indicated by the screen watermark, by a ping request sent by the phone over WiFi, to the local router, and from the router to the computer (whether by LAN cable or wireless link).

Again, the result of this test is sent to Comcast across the cellular data service, for presentation to the Comcast technician.

Additionally, or alternatively, software on the computer can be used to try and establish connectivity—within the local wireless network—with the smartphone, e.g., by pinging the smartphone's local address. Again, results are reported to Comcast.

If this test(s) does not complete satisfactorily, this may indicate a problem on the user's side of the cable modem, e.g., with the user's router, wiring, LAN computer hardware, or computer software.

If such a ping test returns a response (i.e., baseline connectivity is established), the computer may be able to communicate with the smartphone using the local network, even though the computer is not able to communicate with the Comcast server across the internet. At this point, the smartphone can try acting as a bridge, or relay, between the Comcast server/technician and the user's computer. Data and instructions sent to the smartphone, e.g., over the carrier's 4G LTE cellular data network, are routed by the smartphone across the local WiFi network to the computer. Conversely, data sent from the computer across the local WiFi network is forwarded-on to Comcast using the cellular data network. The smartphone is a bridge between these two networks. (In some phone architectures, the cellular data network is not used if a WiFi connection is present. In this case, it may be necessary to disable the WiFi connection—at intervals—to exchange data with Comcast over the cellular data channel.)

Once connectivity is established in this fashion, Comcast can activate (or install and activate) agent software on the computer to gather and dispatch diagnostic information and take other actions, as discussed earlier—with all of such communications passing through the smartphone as an intermediary.

If a link between Comcast and the user's computer cannot be established in this manner (i.e., employing WiFi from a wireless router connected to the user's cable modem), a second phase of operation is commenced. In this second phase, the smartphone app enables a "local hotspot" function of the smartphone. In this mode, the phone makes available its cellular data service to other nearby devices, using a WiFi transceiver in the phone. The user is prompted—by the smartphone app—to instruct the computer to connect to the local hotspot WiFi. (The particulars depend on the computer. In Windows 7, this can involve clicking on a WiFi icon in the System Tray portion of the user interface—commonly in the bottom right corner of the screen. The user then identifies the local hotspot from a list of available WiFi networks, clicks it, and then clicks a Connect button. In other configurations, the computer may connect automatically to the local hotspot network—without any action by the user.) In this mode, the computer is linked to the smartphone without involvement of any external cables, routers, or other hardware.

If the computer succeeds in establishing a WiFi connection, a DHCP server in the phone assigns the computer an address on a local hotspot wireless network. The smartphone app reports results of this local hotspot activity to Comcast—including the computer's newly-assigned IP address, in some embodiments. (This address will be different than the IP address indicated by the computer's on-screen watermark.)

At this point, the smartphone again can act as a bridge, or relay, between the Comcast server/technician and the user's computer. Data and instructions sent to the smartphone, e.g., over the carrier's 4G LTE cellular data network, are routed by the smartphone app to the computer—this time using the local hotspot network of the phone. Conversely, data sent from the computer across the local hotspot network is forwarded-on to Comcast using the cellular data network. The smartphone is again bridge between these two networks.

As before, once connectivity is established in this fashion, Comcast can employ agent software on the computer to gather diagnostic information and take other corrective actions, with all of such communications passing through the smartphone as an intermediary.

If connectivity cannot be established through the phone's local hotspot capability, then a third phase of operation is commenced in which the smartphone app software tries to connect with the computer using Bluetooth. Again, some involvement by the user, on the computer, may be required—to instantiate the Bluetooth pairing. Or not. In any event, if the smartphone is successfully paired with the computer by Bluetooth, this provides an alternative channel to the computer. As before, traffic between the smartphone and Comcast is sent across the cellular data service, and then transitions to Bluetooth for exchange with the computer.

If no Bluetooth channel can be established, other alternatives can be investigated, such as NFC. If no two-way channel can be established, then resort may be had to a one-way channel, e.g., software in the computer dumping diagnostic information for presentation to the smartphone as a "movie" of information encoded on the computer display—changing every fraction of a second to convey successive chunks of payload bits. The smartphone receives and decodes these screens of visual information, and relays the information (e.g., by 4G) to Comcast.

From the foregoing it will be recognized that the smartphone app progresses from one phase to another—exploring a sequential hierarchy of connection options, until one succeeds in establishing a link between Comcast and the computer. At each step, results can be reported to Comcast for diagnostic purposes.

While the above discussion detailed a particular sequence of alternatives, other sequences can naturally be employed—using the same alternatives or different alternatives. For example, other communication channels can include audio data, Zigbee, optical signaling (such as by visible or infrared LEDs and photosensors), NFC data, etc. Some of these may require protocol conversion or other reformatting of the data. For example, data on the cellular data network may be formatted using TCP/IP, whereas data on a Bluetooth channel may be formatted using an RS-232 emulation, such as RFCOMM. The software app can be configured to effect such protocol/data formatting conversions.

Figure 17:
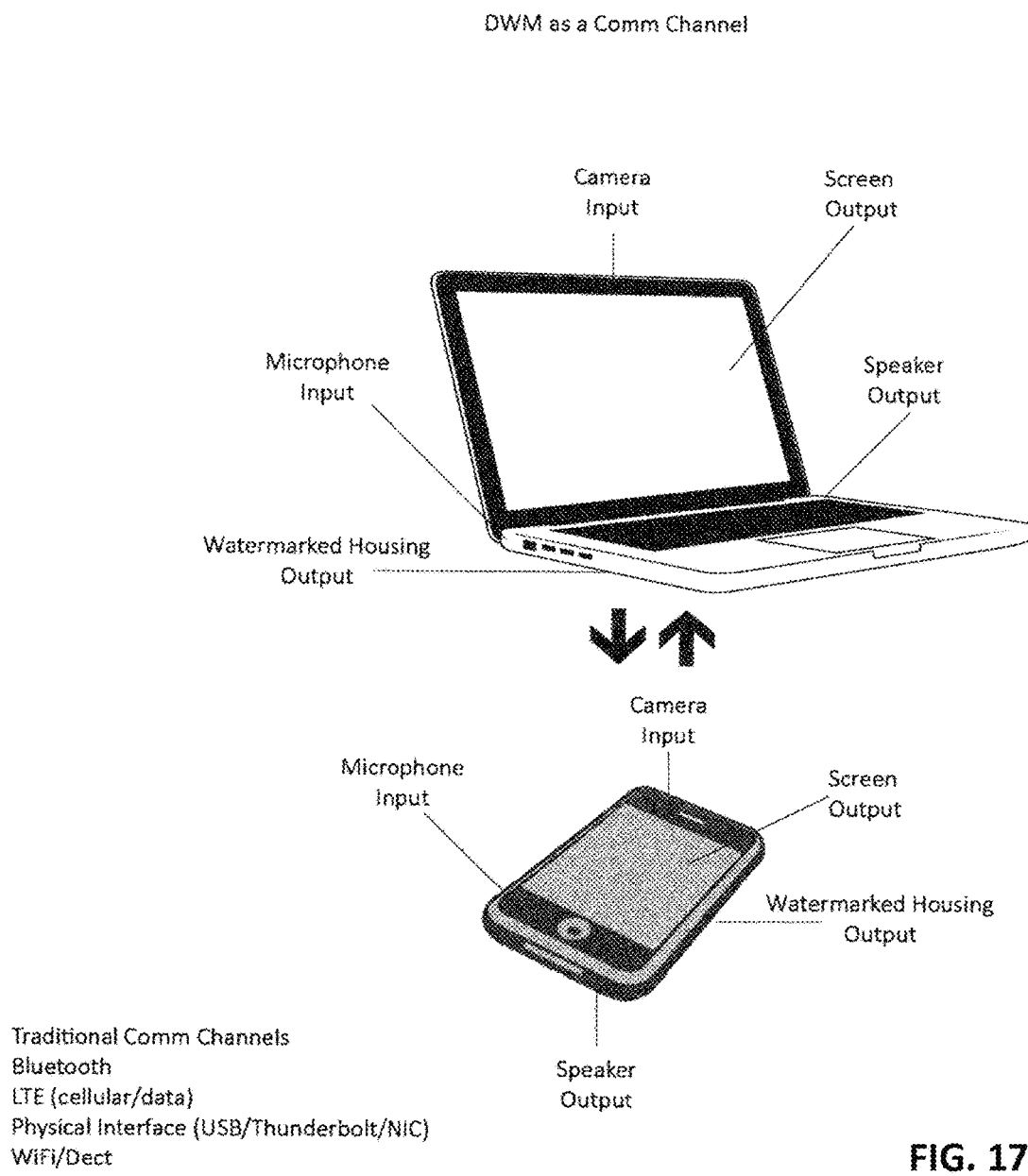
FIG. 17 identifies some of the many different ways data can be emitted or received by a laptop and a smartphone.

It will be recognized that a phone used in this manner can serve as a translator between any of the varieties of communication that the phone supports. For example, any device that supports WiFi can now be used with Bluetooth. That is, the device communicates with the phone by WiFi, and the phone communicates to the world by Bluetooth, and exchanges the data between the two comm channels. Thus, the device can similarly communicate to the world by Bluetooth. FIG. 17 details some of the comm channels between which a phone (and a laptop) can serve as an intermediary.

The data bandwidth of a screen display, if dedicated to data communication (e.g., displaying a time-varying, snow-like pattern), should not be overlooked. The iPhone 6 has a display resolution of 1334×750 pixels (at 326 pixels per inch), or one million pixels. Refreshed 30 times a second yields 30 million pixels, each of which can have any of 256 different values, representing 8 bits. So a theoretical channel capacity of 240 million bits per second exists.

256 different levels can't be sensed reliably, so quantize that down to 32 different levels (representing five bits instead of eight). That brings the channel capacity down to 150 million bits per second. Through use of forward error correction techniques (such as erasure, Reed Solomon, BCH and Turbo codes), reliably is increased at the cost of channel bandwidth. Figuring a ten-times reduction in channel bandwidth (to gain a commensurate increase in channel reliability) yields 15 million bits per second. Even if each display frame is presented for three consecutive periods in the 30 fps sequence to further aid reliability, a channel of 5 million bits per second results.

The iPhone 6 camera has an 8 megapixel sensor (as contrasted with the 1 megapixel iPhone 6 display). Thus, if an 8 MP iPhone 6 camera images a 1 MP iPhone 6 display (with the latter fully filling the viewing frame of the former), each display pixel is sampled by eight camera pixels—a reliable over-sampling margin. (Even if the display only half-fills the camera's viewing frame, a 4× oversampling is achieved.) Geometrical registration of the captured imagery (e.g., correcting for affine distortion) can rely on the rectangular screen border (which may be of known aspect ratio).

It will thus be appreciated that such a pairing of two devices yields a visual data channel with an error-corrected bandwidth on the order of 5 Mbps—rivalling most DSL connections. And this is a conservative calculation that will often be exceeded in practice (especially as display screens and cameras continue to improve).

(The representation of arbitrary binary data as visual patterns is well known, e.g., from the cited watermarking references. Ditto suitable forward error correction techniques.)

One application of such a data-carrying snow pattern is to serve as a voice for a mute computer that has suffered a "blue screen of death." The too-familiar blue screen is presented by the Windows operating system after an unrecoverable error has been encountered. In accordance with the present technology, such an error causes Windows to trigger a function in the display driver hardware that reads the contents of RAM memory, encodes it as a snow pattern as described above, and writes it to the screen. When the time-varying snow pattern has finished playing, it can repeat—indefinitely. The snow pattern can occupy the entirety of the screen, but more typically takes up just a significant fraction, e.g., half, while the traditional "blue screen" contents are displayed on the other half of the screen.

Alternatively, such a snow pattern can be invoked in response to action by agent software on a computer, to visually convey information when other communication channels (e.g., a LAN connection) are unavailable. For example, a complete inventory of diagnostic data (as detailed above) can be sent in this fashion.

Although the present technology is described primarily in the context of communicating with a device that is normally connected to the internet, the technology also finds application with devices that are not connected to the internet. Examples include medical devices (e.g., IV pumps), aviation and marine navigation equipment, industrial machines, etc. For example, a smartphone or other device can capture identifying information from such apparatus, and use that identifying information to establish a communication channel to remote systems—with the smartphone as a bridge between two communication channels. The first communication channel is one available to the apparatus for receiving and emitting information (and with which the smartphone can also engage). The second communication channel is a network channel to the internet supported by the smartphone, such as its cellular data network. The smartphone and associated software serve to link the two channels—providing connectivity to services on the internet that would otherwise be unavailable to the apparatus.

A smartphone can also serve as a control terminal for such a device. The device and phone are logically paired together, by, e.g., a shared key. (For example, the device may emit its serial number to the phone in the form of encoded visual or audio information emitted from one or more LEDs, a display screen, or a speaker. The phone can encrypt this serial number with its private key, and send it to a trusted certification authority. The authority decrypts the serial number—using the phone's public key, and checks a database to ensure that the phone is authorized to interact with that device. If so, it returns to the phone a time-varying (rolling) key value that is presently being employed by the device (encrypted with the smartphone's public key). The smartphone decrypts this value (using its private key), and then uses this key value to encrypt and decrypt communications thereafter exchanged with the device. The device can be equipped with known sensors to allow such communication, e.g., a microphone or IR photodiode. Alternatively, or additionally, the phone can sense a biometric from the user to establish the user identity, and the certification authority can check that this user is authorized to interact with the device, prior to returning the time-varying key value.) Once the phone knows the key being presently used by the device, commands entered on a user interface of the phone (tailored for use with that device), are relayed to the device in encrypted form. Feedback from the device is similarly encrypted and rendered for sensing by the phone (e.g., as encoded visual or audio information). One application of such arrangement is updating the BIOS software in such a normally-internet-disconnected device.

In other such embodiments, a smartphone can be plugged-into a device (e.g., a medical device), by a USB connection. Despite the wired channel between the components, over-the-air conveyance of authentication data (such as by one component emitting audio or visual information, and the other component sensing same), and verification of same by the techniques detailed herein, can be employed. This is a useful defense against hacking by an intruder who interfaces a USB connection to a remote computer for an attack.

Migrating Device Settings to a New Device

Many people are familiar with the task of initializing a new phone (or other device), with programs and data from a previous phone. In the case of the Apple iPhone device, for example, this task involves downloading archived program, content and setting data (hereafter "settings") from the Apple iCloud service, or from the iTunes service, into the new device. (Many users automatically back-up their device settings using the iCloud or iTunes services, so that such information is available for use in configuring a new device, if an old device is lost or disabled.)

A problem with this and other such approaches is the relative lack of security. Anyone who gains access to a user's iCloud credentials (e.g., username and password) can clone that person's phone, including phone numbers, phone history, photographs, emails, etc., by downloading the phone configuration data into a new phone. (Such credentials also allow such phone information to be browsed from any computer.)

In accordance with a further aspect of the technology, this security weakness is addressed by additionally requiring the user to demonstrate physical possession of the old device, before its settings are accessed from a cloud repository (e.g., for downloading into a new device). In a particular embodiment, this further authentication factor, physical possession, is demonstrated by the new device sensing short-range data (e.g., screen imagery, or audio output) from the old device.

In one such arrangement, the user takes an action, or otherwise enables a feature on the old phone (e.g., using the iPhone Settings function), that causes the old phone to digitally watermark its display screen with a payload. The payload can be, for example, a cryptographic hash of user- or phone-specific information, such as the user's iCloud account name, or a phone identifier (e.g., the phone's telephone number, serial number or IMEI). The new phone is used to capture imagery of this watermarked screen. The decoded watermark payload information is checked by a cloud service (e.g., iCloud or iTunes) to ensure that it matches data expected to be presented from the old phone. Only if such a match is confirmed are settings from that old phone downloaded from the cloud into the new device.

(It will be recognized that the watermark decoding can be performed by the new phone, or the captured imagery can be sent to the cloud service, which decodes the watermark. The cloud service can share cryptographic key data with the old phone in various known ways. For example, the old phone can encrypt the watermark payload with its private key of an asymmetric key pair. The cloud service can decrypt the watermark payload with a corresponding public key, which is stored in the iCloud account for that phone.)

Instead of verifying proximity of the new and old phones by the former capturing imagery from the latter, the roles can be reversed: the procedure can require that the old phone capture imagery from the screen of the new phone. The imagery on the screen of the new phone is encoded with a watermark payload. Extraction of expected watermark payload data from this captured imagery (by the old phone, or by a cloud service) confirms that the two devices are in the common possession of a single party—again serving as an authentication factor in addition to the usual username/password.

Audio can be used similarly. In response to a user setting, one of the two phones can emit an audio signal in which payload data is overtly or steganographically encoded. The other phone captures such audio with its microphone, and the payload information is recovered and compared—in the cloud—with expected data. Only if the data matches expected data is the new phone configured with settings from the old. (One failure mode of smartphones involves a catastrophic fall to a hard surface, fracturing the display screen. Such a phone may still be able to function—to the extent of controlling audio routed to its speaker.)

Sometimes the old phone may be lost or inoperative. In such case, the present technology should not be an impediment to downloading settings to a new phone.

In accordance with this aspect of the technology, a new phone can be updated with data from a lost or broken old phone, without employing the above-described authentication process, if the old phone has been disconnected from network services for more than a threshold interval of time, e.g., an hour or a day. If a user has lost the old phone, and its battery is still alive, the old phone can be killed by known remote kill functionality, taking it off the network. After the threshold period has passed, its settings can be downloaded to a new phone. If a lost phone's battery has died, this, too, will take it off the network, allowing its settings to be transferred to a new phone without demonstrating possession of the old phone. (Network connectivity can be demonstrated in various ways, such as determining whether the old phone has connected with the iCloud server on its usual back-up schedule, and whether the cell carrier reports that its periodic polling of the phone has been successful.)

Features of the above-described technology can be incorporated into the arrangements detailed by Apple in its patent publication 20150089091. Similarly, features detailed in the Apple publication can be incorporated into the above-described arrangements.

Multifactor Authentication, and the Thumb

As is evident from the foregoing, the ability to establish that a first device is proximate to a second device (e.g., by demonstrated ability of the first device to sense information from a screen of a second device) serves as a useful factor by which to confirm that the first device should be authorized to engage in a transaction with the second device. Hacking attacks carried out from a distance, over a network, would be foiled if such a proximity factor were in widespread use.

Smartphones increasingly are being equipped with biometric sensors—primarily fingerprint readers (although other biometric sensors—such as retinal scanners and voice recognition are also known). A biometric sensor is commonly used as an "inherence factor" in an authentication test, e.g., to demonstrate authority to get past a smartphone's lock screen, instead of the more familiar entry of a PIN code (a "knowledge factor," in multi-factor authentication parlance).

In accordance with a further aspect of the present technology, authentication proceeds on a multifactor basis—requiring satisfactory demonstration of both an inherence factor and a proximity factor. The ability of a smartphone to establish both these factors enables it to serve as a common multifactor authentication gateway in a variety of different scenarios.

To illustrate: millions of employees begin their day by the keystroke Control-Alt-Delete on their locked Windows computers. They then must type a lengthy password, and hit Return. If they haven't mis-typed, or had CapsLock on (two mistakes that are commonly overlooked, since the password typically is represented by asterisks), then the computer finally unlocks.

A better alternative is for the user to hold their smartphone near the computer, and simply put their thumb on the fingerprint sensor. The smartphone captures a local emission from the computer (e.g., an on-screen watermark). From the payload decoded from such emission, the smartphone understands that it is sensing a locked computer that is awaiting login-credentials. The payload also identifies the computer. If the smartphone program receives confirmation from the fingerprint sensor that the smartphone's registered owner has been detected, then the smartphone program transmits to the computer that owner's credentials for logging in to that computer.

Essentially the same arrangement works anywhere. Approaching a locked car, the user pulls out a cell phone and puts a thumb on the fingerprint sensor. The phone senses a short-range emission from the car (e.g., an ultrasonic audio data signal), which identifies to the phone the context: the user's locked car. Based on this context, the smartphone program provides an appropriate response: sending credentials to unlock and start the car. After confirmation that the sensed fingerprint matches that of the registered phone owner, the program does so—prompting the car to unlock and start.

So, too, when the user reaches the office. Again, a thumb is placed on the fingerprint sensor. Approaching the locked door, the phone senses a short range Bluetooth LE signal emitted from the building, near the door, indicating the context (e.g., the door to work, which needs unlocking). Again, if the fingerprint matches the registered owner, then credential of that owner for unlocking that door are sent.

Likewise with equipment at work. The user may be among the few authorized to change settings on a chemical vapor deposition machine used in a manufacturing line. Approaching the machine, the user again places their thumb on the smartphone fingerprint sensor. Within a threshold interval of time thereafter, the user employs the phone to capture imagery from a display screen of the machine. The smartphone detects a watermark in the captured imagery, which identifies the machine, and specifies how the machine is equipped to receive authorization credentials (e.g., by Bluetooth, with specific communication parameters). The smartphone responds by sending the user's authorization credentials, using the indicated communication technique and parameters.

As noted, in many such exchanges, the user is identified to the device. This allows operation of the device to be customized to the particular user (e.g., car mirrors and seats can be repositioned to that user's preferred positions; a car radio can be tuned to that user's preferred station, etc.).

The sending of credentials can employ any communications channel, including the internet, local wireless (e.g., WiFi or Bluetooth or RFID signaling), ultrasonic audio, etc. And the user needn't launch a different app for each context scenario. Indeed—the user needn't even power-on the phone. Increasingly, phones are provided with low power digital signal processors (e.g., the Hexagon processor in Qualcomm's Snapdragon system-on-a-chip) that can sense and decode stimulus without using the main processor, or activating other high power loads such as the screen. (Such functionality allows, e.g., the Ski program in Apple's phones to respond to spoken instructions, even when the phone is dark and seemingly idle.) The phone only awakens whatever system component(s) are needed to respond to the particular stimulus sensed by the device when in its low power state.

More on Bluetooth

The reader is presumed to be familiar with Bluetooth, in embodiments employing such technology. In many embodiments, Secure Simple Pairing (SSP), or Out-of-Band (OOB) pairing is used. Such embodiments can proceed according to the document "Bluetooth Secure Simple Pairing Using NFC," published by the NFC forum as Application Document NFC Forum-SF-BTSSP_1_1, Jan. 9, 2014, by replacing the NFC tag (chip) as a payload channel, with a digital watermark (either image or audio) to convey payload data. Additional information on Secure Simple Pairing is provided in the document "Bluetooth® User Interface Flow Diagrams for Bluetooth Secure Simple Pairing Devices," published by the Bluetooth Usability Expert Group, Sep. 13, 2007. Both of these documents are appended to application 62/152,729, and form part of the present specification.

As is familiar, a central concept with SSP is putting a device in a "searching" mode to find Bluetooth devices. Normally, a user-initiated action serves to put a device in a searching mode. In accordance with aspects of the present technology, detection of a watermark payload serves to initiate the searching mode.

Many people are familiar with the challenge of pairing a smartphone with their car. This process can be simplified by having the car emit a watermark signal, which is picked-up by the smartphone, and serves to initiate pairing. The watermark signal can be encoded in some or all of audio output by the car entertainment system. For example, turning on the radio—even to AM static—can serve to launch the phone into searching mode. Similarly, the phone camera can capture imagery of an electronic display (e.g., part of the car's entertainment system, or a dashboard display), and extract a steganographically-encoded signal from the captured imagery that triggers the searching mode.

After software on the phone detects the watermark, it checks to see if the broadcasting device (e.g., car) is already a trusted connection. If it is, then pairing proceeds immediately. If it is not, software on the phone initiates a connection to the car (replacing the need for the user to initiate the transaction). The connection then proceeds with service negotiation, etc., by known steps (e.g., as shown in FIG. 17 of the above-referenced 2007 Bluetooth document).

The software—both to detect watermark information, and to initiate pairing—can be a smartphone app that is selectively launched by the user. More desirable, however, is for such software to always run in the background—even when the phone is otherwise asleep—alert to such Bluetooth pairing opportunities.

While the above discussion concerned Bluetooth device pairing with a car, it will be recognized that such procedure is generally applicable to other device pairing scenarios, e.g., with a home entertainment system, as a bridge to an impaired PC, etc. (As in the car example, the emission of watermark information can occur continuously, or it can be emitted in response to a triggering action, such as a user selecting a "Help Me" operation from a user interface, or a user launching related software.) In the bridge application, once the connection is established, software on one device (e.g., the computer) requests/establishes a Personal Area Network (PAN) connection with the other device (e.g., the smartphone). Once the PAN is established, the smartphone can "phone home' to Comcast (or other service provider), and send parameters needed to create a communication channel from Comcast to the computer over the PAN.

Multimedia Setup and Data Exchange

Setting up a home entertainment system can be a hassle. Plug and Play is not the norm. Especially where components of different brands are used together, frustration commonly ensues.

In accordance with another aspect of the technology, component devices emit parameters needed to establish interoperability with other devices steganographically—in the form of encoded audio or visual information. Other devices receive and decode such signals, and use the extracted information in establishing setting their own parameters.

For example, a television screen may emit information detailing its configuration, including pixel dimensions, preferred refresh rate, etc. A Blu-ray player can sense this information, and configure its output signals accordingly. (The Blu-ray player may sense a steganographic audio signal, or the screen data may be sensed by the camera of a user's smartphone. After decoding the information, the smartphone can relay the sensed information to the Blu-Ray player for its use.)

The television screen may alternatively emit an "EID" identifier, which serves to identify a set of corresponding technical metadata that can be used by other devices in configuring themselves for compatibility.

Watermarks can thus serve as the glue that binds heterogeneous systems. Apple, Sony and Samsung have proprietary ecosystems of devices that have been engineered to cooperate with each other. But heterogeneous systems lack this inherent advantage; cooperation is an effort, rather than a given. Through use of watermarks to disseminate information among the devices, cooperation is achieved, with an ease that approaches that of homogenous systems.

Relatedly, display screens can publish information about the local network environment. One example is a shopping mall, in which an electronic screen in the display window of a store presents video promotions or price information for that store's products (typically sent from a corporate server), which are digitally watermarked. The watermark serves to identify the location of the screen (e.g., the Banana Republic store window #2 at Phipps Plaza shopping mall in Atlanta). Viewing the screen with a smartphone camera, and the Discover app, leads to additional information about store products—based on the encoded watermark. The watermark payoff information (encoded in the watermark, or accessed from a remote data store based on a watermarked identifier) can also include a WiFi security key—enabling the user access to the WiFi network at Banana Republic store, e.g., so the user can access internet content (e.g., streaming music from the Pandora service) without incurring cell phone data charges.

Similarly, when a user walks into a coffee shop, the background audio soundtrack can convey a digital watermark payload. The user's smartphone can decode the background signal and engage in transactions, using the encoded information (e.g., registering using the OAuth standard). The user can thereby be authenticated to access a variety of services (e.g., WiFi).

Looking ahead, different components of computer systems may each have their own IPv6 addresses, e.g., each microphone, screen, UI button, etc. Ad hoc collaboration among such components can be established by watermark signals emitted by each such component. For example, a graphical control displayed on the screen of a user's smartphone can collaborate with a speaker in a television, and serve as a volume control for that speaker.

Concluding Remarks

Having described and illustrated the principles of our inventive work with reference to illustrative examples, it will be recognized that the technology is not so limited.

For example, while reference was made to public key cryptography in certain embodiments, this is not essential. Communication between devices can be secured in alternative ways. One such alternative way is with shared one-time keys. The keys can be independently generated, e.g., by the tablet and desktop computers, by a mathematical operation performed on some local context information to which each has access, e.g., through attached physical sensors. For example, barometric pressure, temperature, and features derived from ambient audio, can serve as the seed for a pseudo-random number generator—the output of which serves as a shared cryptographic key for a session.

Rather than using data derived from ambient context data as the seed for generating a key, one device can derive data from one or more of its own operational parameters, and use this value as the seed. Examples are myriad; a few include its CPU processor temperature, its internal fan speed, the number of ongoing processes, a number of hours since last re-boot, etc. This data can be hashed and conveyed to a second device via the watermark presented on the display of the former device. Both devices then separately execute the same pseudo-random number generator routine, seeded by this common value, to establish a shared cryptographic key that is used in securing further communications.

Reference was made to a desktop computer checking a stored list of authorized Helpdesk public keys, and granting access only if the key received from a tablet is found on the list. In another embodiment, the list further details different authorization levels for different public keys. Thus, one IT professional may be granted read-only access to diagnostic data. Another may additionally be granted permission to update various software and settings. Different authorizations can be specified, up to a Level3 staffer, who is authorized to perform any and all actions on the desktop computer.

While reference was made to scripts being stored on a desktop computer, such scripts can naturally be stored and run from anywhere, including a tablet computer or another computer (subject to appropriate authorization). Similarly, except as dictated by security concerns, it will be recognized that other data and software can be stored in/run from any device—including devices distinct from computer 12 and tablet 18. (For example, database 22 needn't be used to lookup the desktop's public key from the decoded watermark payload; this association can be performed by a data structure stored in the tablet.)

In some embodiments of the technology, an initial dump of diagnostic information is customized to the IT professional who triggered its production, with different individuals obtaining different preferred sets of information. Similarly, the initial diagnostic action can depend on the nature of the Helpdesk "ticket" that prompted the IT professional's involvement. For example, if an employee's concern is that computer 12 is slow, one PowerShell script may be run—providing one set of diagnostic information. If the employee's concern is that a particular piece of software is giving an error message, a different PowerShell script may be run—providing a different set of diagnostic information.

While reference has been made to public/private keys associated with the tablet and desktop computers, such reference is also meant to encompass the case where the keys are associated with users of such computers, rather than the computer hardware itself.

Although some of the exemplary embodiments have referenced Windows-specific features, it will be recognized that the technology is not limited to Windows environments, but likewise finds utility with Apple OS, UNIX, and other arrangements.

In some Helpdesk embodiments, the technology is employed to log the Helpdesk staffer into a user's computer in a separate logon session, with the staffer's own login credentials. This session may proceed concurrently with the existing user session, with a different (typically higher) security context.

It will be recognized that the present technology can be incorporated into known system support tools, including Microsoft's Lync, Remote Assistance Request Assistance, and Systems Center Operations Manager software. This latter software (SCOM) is a cross-platform data center management system for operating systems and hypervisors. It uses a single interface that shows state, health and performance information of computer systems. It also provides alerts generated according to some availability, performance, configuration or security situation being identified.

The detailed functionality can likewise be built into enterprise IT management tools offered by vendors such as VMware (e.g., AirWatch), JAMF Software (e.g., Casper Suite), and Good Technology Corporation (e.g., BoxTone).

Many office computers have built-in cameras. Although little-used, such cameras typically stare out and capture imagery—imagery than can be used in connection with the present technology. For example a Helpdesk technician can present to such a camera her own smartphone (or a back of a business card) that displays an image pattern that serves to trigger the office computer to activate its diagnostic agent software, e.g., initializing watermarking of its display screen as described above.

As indicated, the detailed technology is applicable more widely than the specifically-detailed context of IT tech support. It can be used to securely pair any two devices that are equipped with appropriate emitters and sensors. For example, a smartphone and a wrist-worn computer can transfer data by a process that involves the phone camera capturing imagery of a watermarked display on the wrist-worn device (e.g., as shown in applicant's U.S. Pat. No. 7,123,740). Once such pairing is established, a variety of information (e.g., biometric sensor data gathered by the watch) can be securely transferred to the phone. And the phone can set parameters in the watch device, and otherwise reconfigure same, in such a secure session.

Other applications of the present technology involve kiosks, and automated banking machines (ATMs).

The technology also finds application in server farms. Server farms, e.g., of the sort run by Amazon, Google, and Facebook, include racks of computers. To interact with one of the computers, a technician commonly rolls a cart to the rack, and plugs-in a USB or other cable that connects the computer to a terminal (having a screen and a keyboard) on the cart.

Such computers typically each have a small LCD display screen for presenting rudimentary information such as temperature and/or fan speed. Or they have an adhesive inventory control sticker. A tablet carried by the technician can capture imagery of such display screen/sticker, to initiate a Helpdesk session of the sort described above. (Some of the authentication safeguards detailed earlier may be relaxed, since physical access to such server farms is typically tightly controlled.) The rolling-cart-and-wired-connection approach can be avoided except in unusual circumstances.

Similarly, a technician can interact with computerized manufacturing equipment (e.g., in a semiconductor fabrication facility) by sensing information emitted by an associated device (e.g., display), without touching the device, or diverting it from its ongoing task.

The technology can also be employed in retail sales of computers, e.g., in Apple retail stores. If a customer is beginning to play with a display computer, a sales staffer can initiate a parallel session with the computer—using a tablet. The staffer can then demonstrate features of the computer's operation by commands issued through the tablet, without nudging the customer from the keyboard.

As noted, various communication technologies can be used in implementations of the present technology, including not just optical signaling (whether by display screen visible/infrared LEDs, cameras, photosensors, etc.), but alternatively or additionally by audio, radio (e.g., Zigbee, WiFi, Bluetooth, NFC), etc. (An illustrative audio signaling arrangement is detailed in patent publication 20120084131.) Communication can also be via magnetic signals, e.g., mimicking the signals presented by a mag stripe card when passing through a mag stripe reader. Such technology is detailed, e.g., in U.S. Pat. No. 8,814,046.

Although the detailed embodiments involve active (powered) devices, other embodiments can employ unpowered devices. For example, some devices need not be powered, or otherwise active, to present a screen display. So-called "e-ink" displays (e.g., as popularized by Amazon in its Kindle devices) present imagery when unpowered. In accordance with a further aspect of the technology, the graphic artwork displayed on such a screen can be digitally watermarked, or otherwise visually encoded, to convey information of the sort detailed herein from such a device to a reading device, even if unpowered.

Similarly, a fixed data symbology (e.g., a watermark) can be encoded into a device, by texturing of its housing. Such a symbology can convey some or all of a device identifier for the device, or a hash based thereon (e.g., on the device MAC address, IMEI, or serial number).

Reference was made to "remote" computers and other devices. A first device is regarded as "remote" from second device if it is not within viewing distance of the second device. Conversely, a first device is regarded as "proximate" to a second device if it is within viewing distance of the second device.

It will also be recognized that the technologies detailed herein can be included in systems employing established authentication standards, such as OAuth (e.g., per IETF RFCs 6749 and 6750)—introducing a physicality lacking from many other authentication efforts.

While the detailed embodiments generally include steganographic techniques for conveying data, this is not essential; other forms of data transmission may be employed. In the case of screen displays, machine readable data representations—such as bar codes and QR codes—may alternatively be used (subject to other application constraints, such as aesthetics).

Although reference was made to app software on a smartphone that performs certain of the detailed functionality, in other embodiments these functions can naturally be performed otherwise—including by operating system software on a smartphone, by a server at a social networking service, by another smartphone or computer device, distributed between such devices, etc.

While reference has been made to smartphones, laptops, tablets, servers, and desktop computers, it will be recognized that this technology finds utility with all manner of devices—both portable and fixed. Devices including digital cameras, wrist- and head-mounted systems and other wearable devices, servers, etc., can similarly make use of the principles detailed herein. (The term "smartphone" should be construed herein to encompass all such devices, even those that are not telephones.)

Particularly contemplated smartphones include the Apple iPhone 6; smartphones following Google's Android specification (e.g., the Galaxy S6 phone, manufactured by Samsung, and the Google Moto X phone, made by Motorola), and Windows 8 mobile phones (e.g., the Nokia Lumia 1020, which features a 41 megapixel camera).

Details of the Apple iPhone, including its touch interface, are provided in Apple's published patent application 20080174570.

While reference has been made to a desktop computer, this is meant to encompass laptop computers—which many employees use as their desktop computers.

The design of computing devices referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.). Mobile devices are additionally equipped with a variety of motion and pose sensors (collectively referred to as motion sensors), which can include 3D accelerometers, 3D gyroscopes, and 3D magnetometers.

The processes and system components detailed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4; the latter includes an ARM CPU, a GPU, and nVidia's Chimera computational photography architecture), graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. As noted, cloud computing resources can be used as well. References to "processors," "modules" or "components" should be understood to refer to functionality, rather than requiring a particular form of implementation.

Implementation can additionally, or alternatively, employ special purpose electronic circuitry that has been customdesigned and manufactured to perform some or all of the component acts, as an application specific integrated circuit (ASIC).

To realize such an implementation, the relevant module(s) (e.g., watermark decoding) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Essentially all of the functions detailed above can be implemented in such fashion, e.g., decoding a watermark payload from captured imagery, querying databases, etc. However, because the resulting circuit is typically not changeable, such implementation is best used for component functions that are unlikely to be revised.

As indicated above, reference to a "module" that performs a certain function should be understood to encompass one or more items of software, and/or one or more hardware circuits—such as an ASIC as just-described.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. In some embodiments, homomorphic encryption techniques are employed, allowing computations to be performed on encrypted data, to minimize when and how sensitive information is stored in clear-text. (Further information on this topic is presented in application 62/115,822, filed Feb. 13, 2015.)

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Extraction of watermark information from imagery is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

As indicated, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. Exemplary wearable technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

A wearable device can perform background monitoring of watermark information available in the local environment, and switch into action (e.g., issuing a haptic alert to the user, or launching another action) if the encoded information changes.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

As noted, the mobile device software app used to capture screen imagery, and extract payload information, can be based on applicant's Discover app. This app uses technology detailed, e.g., in patent publications 20110212717, 20110161076, 20120208592, 20130311329, 20140052555, 20140357312 and 20150016712.

Other work concerning proximity-based authentication is detailed in patent documents U.S. Pat. No. 8,498,627, 20140279493, 20140244514, 20140106710 and 20130308817, and in pending application Ser. No. 14/739,251, filed Jun. 15, 2015.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated. The reader is presumed to be familiar with such prior work.

For example, it is desirable to adapt the strength or chrominance of a watermark pattern in accordance with characteristics of the host imagery (e.g., desktop display) with which it is presented. Such adaptation is detailed in the cited documents. Similarly, applicant contemplates that software in a screen-reading device will need to process imagery captured from a screen to account for the camera's pose relative to the screen, in order to extract the encoded watermark payload. Again, such processing is detailed in the cited documents. A great variety of other such details are provided in the cited documents, for use in conjunction with the present technology.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. A method employing two computer systems, the first computer system including a display screen and a keyboard, the second computer system including a display screen and a camera, the method comprising acts of:
   (a) capturing imagery from the display screen of the first computer system with the camera of the second computer system, while the display screen of the first computer system presents on-going work by a user thereof;
   (b) by reference to the captured imagery, determining first key data by applying a steganographic decoding process to the captured imagery to extract the first key data therefrom;
   (c) at the second computer system, encrypting a message using said first key data, and transmitting the encrypted message to the first computer system; and
   (d) as a consequence of said transmitting, receiving diagnostic information from the first computer system at the second computer system, and presenting said diagnostic information on the display screen of the second computer system;
   wherein the display screen of the first computer system is used in obtaining diagnostic information for said first computer system, without removing the user's on-going work from the first computer system display screen, and without use of the first computer system keyboard.

2. The method of claim 1 that further includes:
   the first computer decrypting the message;
   the first computer confirming that an identifier in the decrypted message is found on a list of identifiers stored in the first computer; and
   transmitting said diagnostic information after said confirming.

3. The method of claim 1 in which the diagnostic information includes one or more elements of user information, and one or more elements of system information.

4. The method of claim 3 in which the one or more elements of user information includes at least one item selected from the list: identification of the user and the user's domain, user account expiration data, user password expiration data, a date the user password was last reset, identification of user profiles on the first computer, local and group policies applied on the first computer, and an organization unit location with which the first computer is associated.

5. The method of claim 4 in which the one or more elements of user information includes two or more items selected from said list.

6. The method of claim 3 in which the one or more elements of system information includes at least one item selected from the list: data identifying the first computer's operating system, and its version or service pack, network settings, IP address, MAC address, default gateway, programs configured to launch on startup, hardware specifications, a list of installed programs, identification of an active anti-virus client, locals certificates, shared folders on the first computer, disk performance information, locally-installed printers, and event viewer and login viewer information.

7. The method of claim 6 in which the one or more elements of system information includes two or more items selected from said list.

8. The method of claim 1 in which act (b) includes determining first public key data corresponding to the first computer system.

9. The method of claim 8 in which the message includes second public key data different than the first public key data, the second public key data corresponding to the second computer system.

10. The method of claim 9 that includes receiving the diagnostic information in encrypted form, and decrypting the received diagnostic information using second private key data that corresponds to said second public key data.

11. The method of claim 1 that includes authenticating the first computer to the second computer, and authenticating the second computer to the first computer, to establish mutual certification.

12. The method of claim 1 in which act (b) comprises the acts:
   extracting identification data from the captured imagery; and accessing a data structure to determine first public key data for the first computer system that corresponds to said extracted identification data.

13. The method of claim 1 that further includes presenting one or more messages on the first computer display screen, indicating the first computer system is involved in a transaction with the second computer system.

14. The method of claim 13 in which a notification message indicates that the first computer system has received the encrypted first message.

15. The method of claim 13 in which a notification message indicates that the first computer system has transmitted diagnostic information for presentation on the display of the second computer system.

16. The method of claim 1 that includes collecting said diagnostic information using a previously authored script.

17. The method of claim 1 in which the first computer includes plural scripts stored therein, and one of said stored scripts is selected for execution based on identification of a person using the second computer.

18. The method of claim 1 in which the first key data is encoded in a steganographic watermark pattern presented on the display screen of the first computer system, wherein presentment of said steganographic watermark pattern on said display screen is effected (a) by application software that overlays a window across the screen, presenting a low opacity watermark pattern, (b) by an operating system of the first computer system, which impresses a subtle pattern on imagery written to a display buffer of the first computer system, (c) by video driver electronics that alters displayed image data to introduce the steganographic watermark pattern, or (d) by texturing a surface of the display screen to introduce a computer-discernible pattern in rendered screen imagery.

19. A non-transitory computer readable medium containing software instructions enabling a camera-equipped computer to obtain diagnostic information from a user's computer, without removing on-going work of the user from a display screen of the user's computer, and without employing a keyboard of the user's computer, said instructions being operative to configure the camera-equipped computer to:
capture imagery of the user's on-going work from the display screen of the user's computer;
process the captured imagery of the user's on-going work to determine first key data by applying a steganographic decoding process to the captured imagery to extract the first key data therefrom;
encrypt a message using said first key data, and transmit the encrypted message to the user's computer; and
as a consequence of said transmission, receive diagnostic information from the user's computer, and present said diagnostic information on a display screen of the camera-equipped computer.

20. A computer device for obtaining diagnostic information from a user's computer, said device including:
a camera;
a screen;
one or more processors;
a memory containing software instructions configuring the one or more processors to enable the device to perform acts including:
capture imagery of the user's on-going work from a display of the user's computer;
process the captured imagery of the user's on-going work to determine first key data by applying a steganographic decoding process to the captured imagery to extract the first key data therefrom;
encrypt a message using said first key data, and transmit the encrypted message to the user's computer; and
as a consequence of said transmission, receive diagnostic information from the user's computer, and present said diagnostic information on the screen of the device;
wherein the device is capable of obtaining diagnostic information from the user's computer without removing on-going work of the user from the display of the user's computer, and without employing a keyboard of the user's computer.

* * * * *

UNITED STATES PATENT AND TRADEMARK OFFICE
CERTIFICATE OF CORRECTION

| | | |
|---|---|---|
| PATENT NO. | : 10,091,197 B2 | Page 1 of 1 |
| APPLICATION NO. | : 14/989594 | |
| DATED | : October 2, 2018 | |
| INVENTOR(S) | : Rhoads et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 332 days.

Signed and Sealed this
Thirteenth Day of December, 2022

*Katherine Kelly Vidal*

Katherine Kelly Vidal
*Director of the United States Patent and Trademark Office*